US012810231B2

United States Patent
(12) United States Patent
Sinha et al.

(10) Patent No.: US 12,810,231 B2
(45) Date of Patent: Nov. 24, 2026

(54) EMISSION MONITORING SYSTEM BASED ON LOCATION

(71) Applicant: Tyco Fire & Security GmbH, Neuhausen am Rheinfall (CH)

(72) Inventors: Vineet Binodshanker Sinha, Brookfield, WI (US); Kristen Sheppard-Guzelaydin, West Chester, PA (US); Robbie G. Davis, Kew Gardens, NY (US); Katianne Pechauer, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/896,756

(22) Filed: Sep. 25, 2024

(65) Prior Publication Data

US 2025/0013969 A1 Jan. 9, 2025

Related U.S. Application Data

(63) Continuation-in-part of application No. 18/141,088, filed on Apr. 28, 2023, now Pat. No. 12,535,797, and a continuation-in-part of application No. 18/098,003, filed on Jan. 17, 2023, now Pat. No. 12,332,617, which is a continuation-in-part of application No.

(Continued)

(51) Int. Cl.
*G06Q 10/0639* (2023.01)

(52) U.S. Cl.
CPC .............................. *G06Q 10/06395* (2013.01)

(58) Field of Classification Search
None
See application file for complete search history.

(56) References Cited

U.S. PATENT DOCUMENTS

| | | | |
|---|---|---|---|
| 7,580,775 | B2 | 8/2009 | Kulyk et al. |
| 7,894,946 | B2 | 2/2011 | Kulyk et al. |
| 8,527,108 | B2 | 9/2013 | Kulyk et al. |

(Continued)

FOREIGN PATENT DOCUMENTS

| | | | |
|---|---|---|---|
| AU | 2021103663 | A4 | 8/2021 |
| CA | 2761416 | A1 | 11/2010 |

(Continued)

OTHER PUBLICATIONS

Aik Tan and Darin Nutter, “CO2e emissions from HVAC equipment and lifetime operation for common U.S. building types,” 2011, International Journal of Energy and Environment, vol. 2, Issue 3, pp. 415-426 (Year: 2011).*

(Continued)

*Primary Examiner* — Amanda Gurski
(74) *Attorney, Agent, or Firm* — Foley & Lardner LLP

(57) ABSTRACT

A system can include one or more memory devices that can store instructions thereon. The instructions can, when executed by one or more processors, cause the one or more processors to receive emission information corresponding to a location, extract a plurality of emission sources associated with the location, determine an emission value for the location, identify a plurality of emission impacts for the plurality of emission sources that resulted in the emission value, and generate a user interface for display via a display device.

19 Claims, 29 Drawing Sheets

Related U.S. Application Data

17/948,118, filed on Sep. 19, 2022, now Pat. No. 12,422,795.

(60) Provisional application No. 63/541,185, filed on Sep. 28, 2023, provisional application No. 63/435,191, filed on Dec. 23, 2022, provisional application No. 63/336,935, filed on Apr. 29, 2022, provisional application No. 63/246,177, filed on Sep. 20, 2021.

(56) References Cited

U.S. PATENT DOCUMENTS

| | | | | |
|---|---|---|---|---|
| 8,527,109 | B2 | 9/2013 | Kulyk et al. | |
| 8,918,223 | B2 | 12/2014 | Kulyk et al. | |
| 9,110,647 | B2 | 8/2015 | Kulyk et al. | |
| 9,310,403 | B2 | 4/2016 | Brackney et al. | |
| 9,429,923 | B2 | 8/2016 | Ward et al. | |
| 9,703,339 | B2 | 7/2017 | Kulyk et al. | |
| 10,139,877 | B2 | 11/2018 | Kulyk et al. | |
| 10,241,505 | B2 | 3/2019 | Cohen et al. | |
| 10,678,227 | B2 | 6/2020 | Przybylski et al. | |
| 10,718,542 | B2 | 7/2020 | Alanqar et al. | |
| 10,845,791 | B2 | 11/2020 | Cohen et al. | |
| 10,884,398 | B2 | 1/2021 | Elbsat et al. | |
| 10,928,784 | B2 | 2/2021 | Craig et al. | |
| 11,068,821 | B2 | 7/2021 | Wenzel et al. | |
| 11,164,126 | B2 | 11/2021 | Elbsat et al. | |
| 11,182,714 | B2 | 11/2021 | Wenzel et al. | |
| 11,238,547 | B2 | 2/2022 | Elbsat et al. | |
| 11,531,919 | B2 | 12/2022 | Murugesan et al. | |
| 11,567,466 | B1 | 1/2023 | Galvez et al. | |
| 12,473,811 | B2 * | 11/2025 | Hazazi | G06Q 10/04 |
| 2002/0165671 | A1 | 11/2002 | Middya | |
| 2010/0286937 | A1 | 11/2010 | Hedley et al. | |
| 2010/0318200 | A1 | 12/2010 | Foslien et al. | |
| 2012/0216468 | A1 | 8/2012 | Liu et al. | |
| 2013/0134962 | A1 | 5/2013 | Kamel et al. | |
| 2013/0144546 | A1 | 6/2013 | Brackney et al. | |
| 2014/0236869 | A1 | 8/2014 | Fujimaki et al. | |
| 2015/0316907 | A1 | 11/2015 | Elbsat et al. | |
| 2016/0091904 | A1 | 3/2016 | Horesh et al. | |
| 2016/0103475 | A1 | 4/2016 | Lee et al. | |
| 2016/0109865 | A1 | 4/2016 | Rodrš-guez et al. | |
| 2017/0003676 | A1 | 1/2017 | Yoshida et al. | |
| 2017/0083989 | A1 | 3/2017 | Brockman et al. | |
| 2017/0097616 | A1 | 4/2017 | Cozad et al. | |
| 2017/0103483 | A1 | 4/2017 | Drees et al. | |
| 2018/0196456 | A1 | 7/2018 | Elbsat | |
| 2018/0231967 | A1 * | 8/2018 | Cohen | G05B 23/0208 |
| 2018/0313563 | A1 | 11/2018 | Turney et al. | |
| 2018/0340704 | A1 | 11/2018 | Turney et al. | |
| 2018/0372362 | A1 | 12/2018 | Turney et al. | |
| 2018/0375444 | A1 | 12/2018 | Gamroth | |
| 2019/0079473 | A1 | 3/2019 | Kumar et al. | |
| 2019/0155268 | A1 | 5/2019 | Cohen et al. | |
| 2019/0235453 | A1 | 8/2019 | Turney et al. | |
| 2019/0257544 | A1 | 8/2019 | Alanqar et al. | |
| 2019/0340709 | A1 | 11/2019 | Elbsat et al. | |
| 2020/0026249 | A1 | 1/2020 | Przybylski et al. | |
| 2020/0027096 | A1 | 1/2020 | Cooner | |
| 2020/0041158 | A1 | 2/2020 | Turney et al. | |
| 2020/0132328 | A1 | 4/2020 | Boettcher et al. | |
| 2020/0149768 | A1 | 5/2020 | Turney et al. | |
| 2020/0193345 | A1 | 6/2020 | Elbsat et al. | |
| 2020/0193346 | A1 | 6/2020 | Elbsat et al. | |
| 2020/0218208 | A1 | 7/2020 | Alanqar et al. | |
| 2020/0319610 | A1 | 10/2020 | Ray et al. | |
| 2021/0108821 | A1 | 4/2021 | Turney et al. | |
| 2021/0200164 | A1 | 7/2021 | Ploegert et al. | |
| 2021/0200165 | A1 | 7/2021 | Ploegert et al. | |
| 2021/0200169 | A1 | 7/2021 | Ploegert et al. | |
| 2021/0200170 | A1 | 7/2021 | Ploegert et al. | |
| 2021/0200173 | A1 | 7/2021 | Ploegert et al. | |
| 2021/0200764 | A1 | 7/2021 | Ploegert et al. | |
| 2021/0200792 | A1 | 7/2021 | Ploegert et al. | |
| 2021/0200807 | A1 | 7/2021 | Ploegert et al. | |
| 2021/0200912 | A1 | 7/2021 | Ploegert et al. | |
| 2021/0216052 | A1 | 7/2021 | Ploegert et al. | |
| 2021/0270490 | A1 | 9/2021 | Turney et al. | |
| 2021/0356916 | A1 | 11/2021 | Wenzel et al. | |
| 2021/0365861 | A1 | 11/2021 | Elbsat et al. | |
| 2022/0011731 | A1 | 1/2022 | Risbeck et al. | |
| 2022/0042704 | A1 | 2/2022 | Drees et al. | |
| 2022/0058545 | A1 | 2/2022 | Warake et al. | |
| 2022/0092500 | A1 | 3/2022 | Drees et al. | |
| 2022/0100918 | A1 | 3/2022 | Ploegert et al. | |
| 2022/0137580 | A1 | 5/2022 | Burroughs et al. | |
| 2022/0148102 | A1 | 5/2022 | Elbsat et al. | |
| 2022/0186962 | A1 | 6/2022 | Turney et al. | |
| 2022/0268471 | A1 | 8/2022 | Turney et al. | |
| 2022/0284519 | A1 | 9/2022 | Pancholi et al. | |
| 2022/0299230 | A1 | 9/2022 | Boettcher et al. | |
| 2022/0299963 | A1 | 9/2022 | Waghmare et al. | |
| 2022/0327538 | A1 | 10/2022 | Kumar et al. | |
| 2022/0335547 | A1 | 10/2022 | Wenzel | |
| 2022/0381471 | A1 | 12/2022 | Wenzel et al. | |
| 2022/0390137 | A1 | 12/2022 | Wenzel et al. | |
| 2022/0405327 | A1 | 12/2022 | Swanson et al. | |
| 2023/0020417 | A1 | 1/2023 | Elbsat et al. | |
| 2023/0067755 | A1 | 3/2023 | Raj et al. | |
| 2023/0085641 | A1 | 3/2023 | Jones et al. | |
| 2023/0139152 | A1 | 5/2023 | Smith et al. | |
| 2023/0152757 | A1 | 5/2023 | Lee et al. | |
| 2023/0152763 | A1 | 5/2023 | Davis et al. | |
| 2023/0169220 | A1 | 6/2023 | Ramanasankaran et al. | |
| 2023/0236560 | A1 | 7/2023 | Lee et al. | |
| 2023/0253787 | A1 | 8/2023 | Wenzel et al. | |
| 2023/0305587 | A1 | 9/2023 | Thirumurthy et al. | |
| 2023/0350387 | A1 | 11/2023 | Davis et al. | |
| 2024/0037471 | A1 | 2/2024 | Jones et al. | |
| 2024/0202614 | A1 * | 6/2024 | Shukla | G06Q 10/063 |
| 2024/0222970 | A1 | 7/2024 | Risbeck et al. | |

FOREIGN PATENT DOCUMENTS

| | | | | |
|---|---|---|---|---|
| CN | 105953367 | A | 9/2016 | |
| CN | 109855263 | A | 6/2019 | |
| CN | 113824788 | A | 12/2021 | |
| CN | 113835348 | A | 12/2021 | |
| CN | 215871715 | U | 2/2022 | |
| CN | 114200839 | A | 3/2022 | |
| CN | 114372558 | A | 4/2022 | |
| EP | 2 237 201 | A1 | 10/2010 | |
| EP | 2 504 807 | A2 | 10/2012 | |
| EP | 3 675 003 | A1 | 7/2020 | |
| WO | WO-2010/129913 | A1 | 11/2010 | |
| WO | WO-2012/122234 | | 9/2012 | |
| WO | WO-2022266099 | A1 * | 12/2022 | G06Q 10/06393 |
| WO | WO-2023/044134 | A1 | 3/2023 | |
| WO | WO-2023/140882 | | 7/2023 | |
| WO | WO-2023/154408 | A1 | 8/2023 | |
| WO | WO-2023/212323 | A1 | 11/2023 | |
| WO | WO-2023/212324 | A1 | 11/2023 | |

OTHER PUBLICATIONS

U.S. Appl. No. 18/896,756, filed Sep. 25, 2024, Sinha et al.
U.S. Appl. No. 18/896,758, filed Sep. 25, 2024, Sinha et al.
International Search Report and Written Opinion on PCT Appl. No. PCT/US2023/086099 dated May 16, 2024 (13 pages).
European Office Action on EP Appl. No. 24205362.7 dated Apr. 16, 2025 (2 pages).
U.S. Appl. No. 17/692,642, filed Mar. 11, 2022, Johnson Controls Tyco IP Holdings LLP.
International Search Report and Written Opinion on PCT Appl. No. PCT/US2022/044034 dated Apr. 4, 2024 (6 pages).
International Search Report and Written Opinion on PCT Appl. No. PCT/US2022/044034 dated Dec. 20, 2022 (12 pages).
International Search Report and Written Opinion on PCT Appl. No. PCT/US2023/020413 dated Jun. 20, 2023 (12 pages).
International Search Report and Written Opinion on PCT Appl. No. PCT/US2023/020414 dated Jun. 15, 2023 (22 pages).

(56) References Cited

OTHER PUBLICATIONS

Corrado, "Combining Green Metrics and Digital Twins for Sustainability Planning and Governance of Smart Buildings and Cities," Sustainability, Aug. 2022, vol. 14, art. 12988 (23 pages).
Dalene, F., "Technology and information management for low-carbon building," Journal of Renewable and Sustainable Energy, Jul. 2012, vol. 4, art. 041402 (16 pages).
Dawood et al., "Designing low carbon buildings: A framework to reduce energy consumption and embed the use of renewables," Sustainable Cities and Society, 2013, vol. 8 (pp. 63-71).
Manic et al., "Building Energy Management Systems, The Age of Intelligent and Adaptive Buildings," IEEE Industrial Electronics Magazine, Mar. 2016, vol. 10, No. 1 (15 pages).
Parvin et al., "Intelligent Controllers and Optimization Algorithms for Building Energy Management Towards Achieving Sustainable Development, Challenges and Prospects," IEEE Access, Mar. 2021, vol. 9 (26 pages).
Shaikh et al., "A review on optimized control systems for building energy and comfort management of smart sustainable buildings," Renewable and Sustainable Energy Reviews, Dec. 2014, vol. 34 (pp. 409-429).
Wang et al., "Intelligent Multiagent Control System for Energy and Comfort Management in Smart and Sustainable Buildings," IEEE Transactions on Smart Grid, Jun. 2012, vol. 3, No. 2 (pp. 605-617).
Yang et al., "Building Energy Management Systems," Encyclopedia of Sustainable Technologies, 2017, First Edition, vol. 2 (19 pages).
Betti et al., "CBE Clima Tool: a free and open-source web application for climate analysis tailored to sustainable building design," arXiv.org, Cornell University Library, Dec. 2022, (9 pages)).
Communication on EP Appl. No. 24205362.7 dated May 20, 2026 (6 pages).
Extended European Search Report on EP Appl. No. 24205362.7 dated Feb. 2, 2025 (10 pages).
Gaspari et al., "A GIS-Based Methodology for Speedy Energy Efficiency Mapping: A Case Study in Bologna," Energies, May 2020, vol. 13 (20 pages).
Mutani et al., "GIS-based urban energy modelling and energy efficiency scenarios using the energy performance certificate database," Energy Efficiency, May 2021, vol. 14 (28 pages).
Gbadegesin, T., "Building energy performance standards: impacts on building energy efficiency and GHG emissions in Washington, DC," Applied Energy, 2026, vol. 416 (15 pages).
Mutani et al., "GIS-based urban energy modelling and energy efficiency scenarios using the energy performance certificate database," Energy Efficiency, 2021, vol. 14, No. 47 (28 pages).
Office Action and Search Report on CN Appl. No. 202280062321.7 dated Aug. 20, 2026 (35 pages with English language translation).
Seyedzadeh et al., "Machine learning for estimation of building energy consumption and performance: a review," Visualization in Engineering, 2018, vol. 6, No. 5 (20 pages).

* cited by examiner

560

1200

1300

1400

1600

1700

1800

2000

2100

2300

2400

2500

2700

2800

EMISSION MONITORING SYSTEM BASED ON LOCATION

CROSS-REFERENCE TO RELATED PATENT APPLICATIONS

This application claims the benefit of and priority to U.S. Provisional Patent Application No. 63/541,185, filed Sep. 28, 2023. This application is a continuation-in-part to U.S. patent application Ser. No. 18/098,003, filed Jan. 17, 2023, which claims the benefit of and priority to U.S. Provisional Patent Application No. 63/435,191, filed Dec. 23, 2022 and is a continuation-in-part to U.S. patent application Ser. No. 17/948,118, filed Sep. 19, 2022, which claims the benefit of and priority to U.S. Provisional Patent Application No. 63/246,177, filed Sep. 20, 2021, and U.S. Provisional Patent Application No. 63/336,935, filed Apr. 29, 2022. This application is also a continuation-in-part to U.S. patent application Ser. No. 18/141,088, filed Apr. 28, 2023, which claims the benefit of and priority to U.S. Provisional Patent Application 63/336,935, filed Apr. 29, 2022, and U.S. Provisional Patent Application No. 63/435,191, filed Dec. 23, 2022. The entireties of each of the foregoing patent applications are incorporated by reference herein.

SUMMARY

At least one embodiment is directed to a system. The system can include one or more memory devices storing instructions thereon that, when executed by the one or more processors, cause the one or more processors to receive, from a plurality of data sources, emission information corresponding to a regional area. The instructions can also cause the one or more processors to extract, from the emission information, a plurality of emission sources associated with the regional area. The instructions can also cause the one or more processors to determine, using the emission information and predetermined criteria for regional emissions, a regional emission value for the regional area. The instructions can also cause the one or more processors to identify, based on the regional emission value for the regional area, a plurality of emission impacts for the plurality of emission sources on the regional emission value for the regional area, wherein a given emission impact of the plurality of emission impacts indicates a contribution, by a given emission source of the plurality of emission sources, towards the regional emission value for the regional area, and generate, responsive to identification of the plurality of emission impacts, a regional dashboard for display via a plurality of display devices. The regional dashboard can include a first plurality of graphical representations to identify respective emission sources of the plurality of emission sources. The regional dashboard can also include a second plurality of graphical representations to identify the plurality of emission impacts, and a third plurality of graphical representations to identify a plurality of actions to adjust at least one of the regional emission value for the regional area or at least one emission impact of the plurality of emission impacts.

In some embodiments, the instructions can also cause the one or more processors to monitor, responsive to execution of at least one action of the plurality of actions, the regional emission value for the regional area. The instructions can also cause the one or more processors to detect, based on subsequent emission information, a change in the regional emission value for the regional area, and update, responsive to detection of the change in the regional emission value for the regional area, the regional dashboard to reflect the change in the regional emission value for the regional area.

In some embodiments, the instructions can also cause the one or more processors to execute, responsive to receipt of a selection of at least one action of the plurality of actions, the at least one action of the plurality of actions. The instructions can also cause the one or more processors to determine, responsive to execution of the at least one action of the plurality of actions, a change in the regional emission value for the regional area, and update, based on the change in the regional emission value for the regional area, a Machine Learning (ML) model. The ML model can identify relationships between regional emission values for a plurality of regional areas and one or more actions to adjust the regional emission values for the plurality of regional areas.

In some embodiments, the instructions can also cause the one or more processors to receive, from the plurality of data sources, subsequent emission information pertaining to a plurality of regional areas. The instructions can also cause the one or more processors to determine, based on the subsequent emission information, a plurality of regional emission values for the plurality of regional areas. The instructions can also cause the one or more processors to generate, based on the regional emission value for the regional area and the plurality of regional emission values for the plurality of regional areas, a list including a plurality of tiers, wherein respective tiers indicate a given emission score with respect to the predetermined criteria for regional emissions, and update the regional dashboard to include the list, wherein a plurality of portions of the regional dashboard include a given tier of the plurality of tiers, and wherein the given tier including a given regional area of the plurality of regional areas indicates an emission score for the given regional area.

In some embodiments, the plurality of data sources can include at least one of publicly accessible emission information corresponding to the regional area, a governmental body associated with the regional area, a utility company that services the regional area, or a regulatory entity that collects information pertaining to emissions.

At least one embodiment relates to a system. The system can include one or memory devices. The one or more memory devices can store instructions thereon. The instructions can, when executed by one or more processors, cause the one or more processors to receive, from a plurality of data sources, emission information corresponding to a location. The instructions can cause the one or more processors to extract, from the emission information, a plurality of emission sources associated with the location. The instructions can cause the one or more processors to determine, based on information associated with the plurality of emission sources, an emission value for the location. The instructions can cause the one or more processors to identify, based on the emission value, a plurality of emission impacts for the plurality of emission sources that resulted in the emission value. The instructions can cause the one or more processors to generate, responsive to identification of the plurality of emission impacts, a user interface for display via a display device. The user interface can indicate the plurality of emission sources, the plurality of emission impacts, and a plurality of actions to adjust the emission value or at least one emission impact of the plurality of emission impacts.

In some embodiments, the instructions can cause the one or more processors to monitor, responsive to execution of at least one action of the plurality of actions, the emission value. The instructions can cause the one or more processors to detect, based on subsequent emission information, a change in the emission value. The instructions can cause the one or more processors to update, responsive to detection of the change in the emission value, the user interface to reflect the change in the emission value.

In some embodiments, the instructions can cause the one or more processors to receive, via the user interface, a selection of at least one action of the plurality of actions. The instructions can cause the one or more processors to cause, responsive to selection of the at least one action, a machine learning model to generate an output to indicate a change in the emission value resulting from implementation of the at least one action. The instructions can cause the one or more processors to update, responsive generation of the output, the user interface to display the change in the emission value.

In some embodiments, the instructions can cause the one or more processors to execute, responsive to receipt of a selection of at least one action of the plurality of actions, the at least one action of the plurality of actions. The instructions can cause the one or more processors to determine, responsive to execution of the at least one action of the plurality of actions, a change in the emission value. The instructions can cause the one or more processors to update, based on the change in the emission value, a Machine Learning (ML) model. The ML model can identify between emission values for a plurality of locations and one or more actions to adjust the emission values.

In some embodiments, execution of the at least one action of the plurality of actions can include initiation of automated control one or more pieces of building equipment.

In some embodiments, The instructions can cause the one or more processors to receive, from the plurality of data sources, subsequent emission information pertaining to a plurality of locations. The instructions can cause the one or more processors to determine, based on the subsequent emission information, a plurality of emission values. The instructions can cause the one or more processors to generate, based on the emission value and the plurality of emission values, a list including a plurality of tiers. A first tier of the plurality of tiers can be associated with a first emission value of the plurality of emission values. The instructions can cause the one or more processors to update, responsive to generation of the list, the user interface to include the list. Inclusion of a first location of the plurality of locations within the first tier can provide an indication that the first location includes the first emission value.

In some embodiments, the plurality of data sources can include at least one of open-source emission information corresponding to the location, or information associated with operation of one more pieces of building equipment within the location.

In some embodiments, the instructions can cause the one or more processors to transmit one or more application programming interface (API) calls to a remote device associated with the plurality of data sources. The instructions can cause the one or more processors to receive, responsive to transmission of the one or more API calls, the emission information.

In some embodiments, The instructions can cause the one or more processors to provide, as one or more inputs to a machine learning model, the plurality of emission sources and the emission value. The machine learning model can be trained to identify correlations between previously implemented actions and corresponding changes to emission values. The instructions can cause the one or more processors to cause the machine learning model to generate the plurality of actions based on a correlation between the emission value and the plurality of actions.

In some embodiments, the emission information can include at least one of an indication of carbon emission within the location, an indication of greenhouse gas emission within the location, an indication of energy consumption within the location, or an indication of water consumption within the location.

At least one embodiment relates to a method. The method can include receiving, by one or more processing circuits, from a plurality of data sources, emission information corresponding to a location. The method can include extracting, by the one or more processing circuits, from the emission information, a plurality of emission sources associated with the location. The method can include determining, by the one or more processing circuits, based on information associated with the plurality of emission sources, an emission value for the location. The method can include identifying, by the one or more processing circuits, based on the emission value, a plurality of emission impacts for the plurality of emission sources that resulted in the emission value. The method can include generating, by the one or more processing circuits, responsive to identification of the plurality of emission impacts, a user interface for display via a display device. The user interface can indicate the plurality of emission sources, the plurality of emission impacts, and a plurality of actions to adjust the emission value or at least one emission impact of the plurality of emission impacts.

In some embodiments, the method can include monitoring, by the one or more processing circuits, responsive to execution of at least one action of the plurality of actions, the emission value. The method can include detecting, by the one or more processing circuits, based on subsequent emission information, a change in the emission value. The method can include updating, by the one or more processing circuits, responsive to detection of the change in the emission value, the user interface to reflect the change in the emission value.

In some embodiments, the method can include receiving, by the one or more processing circuits, via the user interface, a selection of at least one action of the plurality of actions. The method can include causing, by the one or more processing circuits, responsive to selection of the at least one action, a machine learning model to generate an output to indicate a change in the emission value resulting from implementation of the at least one action. The method can include updating, by the one or more processing circuits, responsive generation of the output, the user interface to display the change in the emission value.

In some embodiments, the method can include executing, by the one or more processing circuits, responsive to receipt of a selection of at least one action of the plurality of actions, the at least one action of the plurality of actions. The method can include determining, by the one or more processing circuits, responsive to execution of the at least one action of the plurality of actions, a change in the emission value. The method can include updating, by the one or more processing circuits, based on the change in the emission value, a Machine Learning (ML) model. The ML model can identify between emission values for a plurality of locations and one or more actions to adjust the emission values.

In some embodiments, the method can include receiving, by the one or more processing circuits, from the plurality of data sources, subsequent emission information pertaining to a plurality of locations. The method can include determining, by the one or more processing circuits, based on the subsequent emission information, a plurality of emission values. The method can include generating, by the one or more processing circuits, based on the emission value and the plurality of emission values, a list including a plurality of tiers. A first tier of the plurality of tiers can be associated with a first emission value of the plurality of emission values. The method can include updating, by the one or more processing circuits, responsive to generation of the list, the user interface to include the list. Inclusion of a first location of the plurality of locations within the first tier can provide an indication that the first location includes the first emission value.

In some embodiments, the method can include transmitting, by the one or more processing circuits, one or more application programming interface (API) calls to a remote device associated with the plurality of data sources. The method can include receiving, by the one or more processing circuits, responsive to transmission of the one or more API calls, the emission information.

In some embodiments, the method can include providing, by the one or more processing circuits, as one or more inputs to a machine learning model, the plurality of emission sources and the emission value. The machine learning model can be trained to identify correlations between previously implemented actions and corresponding changes to emission values. The method can include causing, by the one or more processing circuits, the machine learning model to generate the plurality of actions based on a correlation between the emission value and the plurality of actions.

At least one embodiment relates to one or more non-transitory storage media. The one or more non-transitory storage media can store instructions thereon. The instructions can, when executed by one or more processors, cause the one or more processors to perform operations that include receiving, from a plurality of data sources, emission information corresponding to a location. The operations can include extracting, from the emission information, a plurality of emission sources associated with the location. The operations can include determining, based on information associated with the plurality of emission sources, an emission value for the location. The operations can include identifying, based on the emission value, a plurality of emission impacts for the plurality of emission sources that resulted in the emission value. The operations can include generating, responsive to identification of the plurality of emission impacts, a user interface for display via a display device. The user interface can indicate the plurality of emission sources, the plurality of emission impacts, and a plurality of actions to adjust the emission value or at least one emission impact of the plurality of emission impacts.

In some embodiments, the operations can include monitoring, responsive to execution of at least one action of the plurality of actions, the emission value. The operations can include detecting, based on subsequent emission information, a change in the emission value. The operations can include updating, responsive to detection of the change in the emission value, the user interface to reflect the change in the emission value.

In some embodiments, the operations can include receiving, via the user interface, a selection of at least one action of the plurality of actions. The operations can include causing, responsive to selection of the at least one action, a machine learning model to generate an output to indicate a change in the emission value resulting from implementation of the at least one action. The operations can include updating, responsive generation of the output, the user interface to display the change in the emission value.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
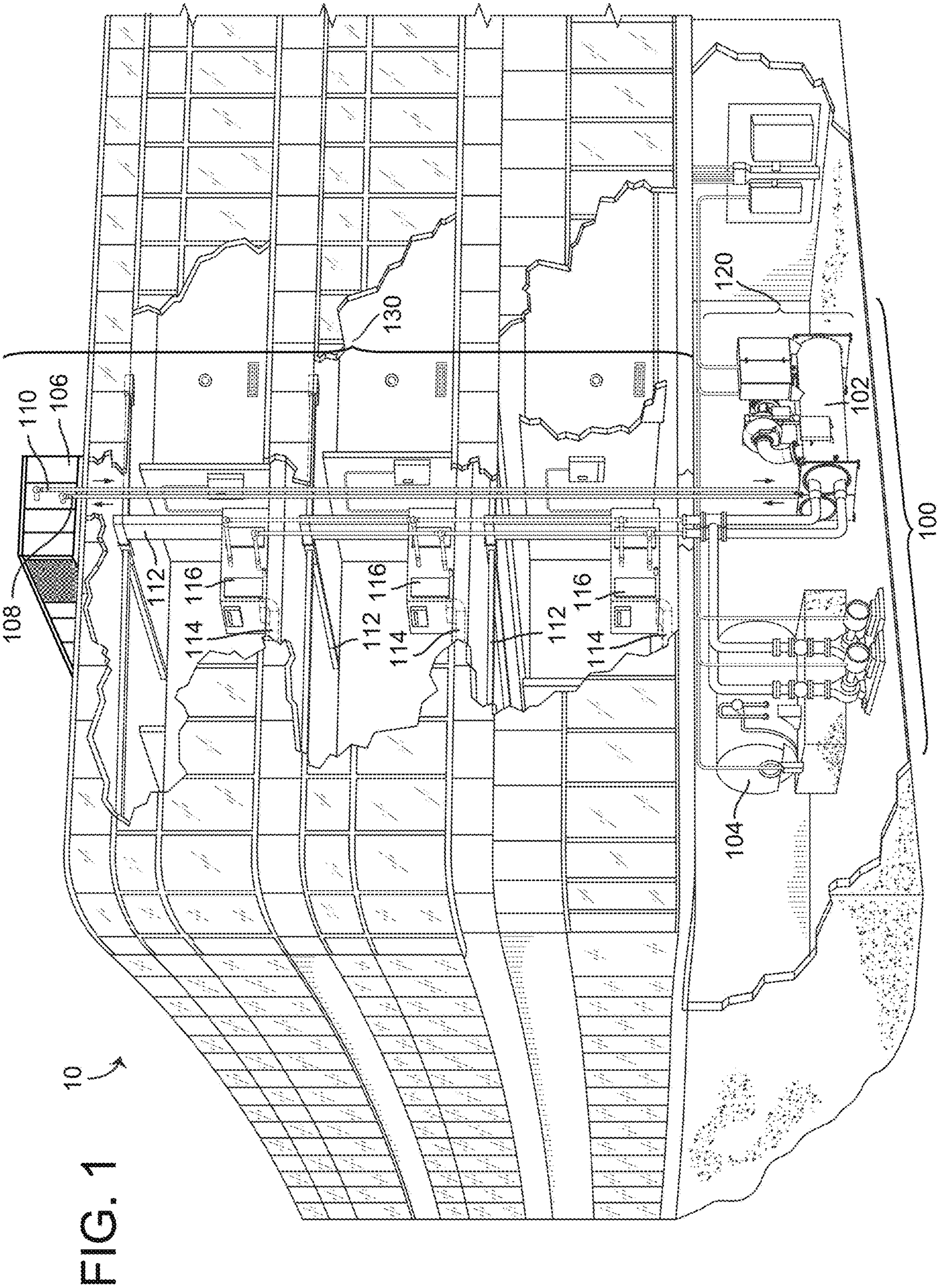
FIG. 1 is a drawing of a building equipped with a heating, ventilation, and/or air conditioning (HVAC) system, according to an exemplary embodiment.

Referring generally to the FIGURES, systems and methods are provided for sustainability assessment and/or improvement for a plurality of regions, according to various exemplary embodiments. An emission monitoring system can be configured to collect various pieces of information regarding a plurality of regions, e.g., emission information, energy consumption, carbon emissions, water consumption, waste production, transportation information, etc. The emission monitoring system can be configured to run an optimization on the emission information to determine regional emission values for the plurality of regions. For example, the emission monitoring system can obtain emission information for a given city (e.g., a region) and the emission monitoring system can determine a regional emission value for the given city. The regional emission value can be and/or include at least one of a carbon emission value (e.g., an amount of carbon emissions attributed to the given city), an energy consumption value (e.g., an amount of energy consumption attributed to the given city), greenhouse gas production, and/or various other types of values and combinations thereof.

The emission monitoring system can interface with, interact with, and/or otherwise communicate with various emission data sources. The various emission data sources can provide emission information in various forms and/or formats and the emission monitoring system can be configured to modify, adjust, and/or otherwise change the formats into a common format. The common format may provide seamless integration of the obtained emission information into various Building Management Systems (BMS) and/or Building Automation Systems (BAS).

Some of the technical solutions described herein include the emission monitoring system obtaining emission information in various formats and modifying the emission information into the common format. The modification of the emission information into the common format provides universal integration of emission information such that various pieces of information are provided within a similar context (e.g., emission information is provided with a similar unit of measure, emission information is provided with a similar threshold value, etc.). The universal integration of emission information may be displayed and/or otherwise provided by a dashboard.

The dashboard may be located within, placed within, and/or otherwise associated with a command center. The command center may include a plurality of display devices (e.g., dashboard devices) and the universal integration of emission information may result in the plurality of display devices generating a uniform collection of emission (e.g., one or more user interfaces providing the dashboard). The dashboard including the universal integration of emission information may provide a uniform representation of various emission information that otherwise would be indiscernible from one another.

The command center may provide regional emission monitoring and/or regional sustainability improvements for the plurality of regions. For example, a local municipality may enroll in and/or otherwise provide integration of the emission monitoring system with the local municipalities utility companies. The emission monitoring system may obtain, responsive to integrating with the local municipalities utility companies, emission information pertaining to the local municipality. For example, the emission monitoring system can obtain energy consumption information (e.g., how much energy is consumed within and/or by the local municipality). The local municipality may include various sensors dispersed and/or otherwise located throughout a geographic area of the local municipality. The various sensors may collect emission information (e.g., carbon emissions, greenhouse gas emissions, etc.) and the collected emission information may be provided to the emission monitoring system.

Building Management System and HVAC System

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
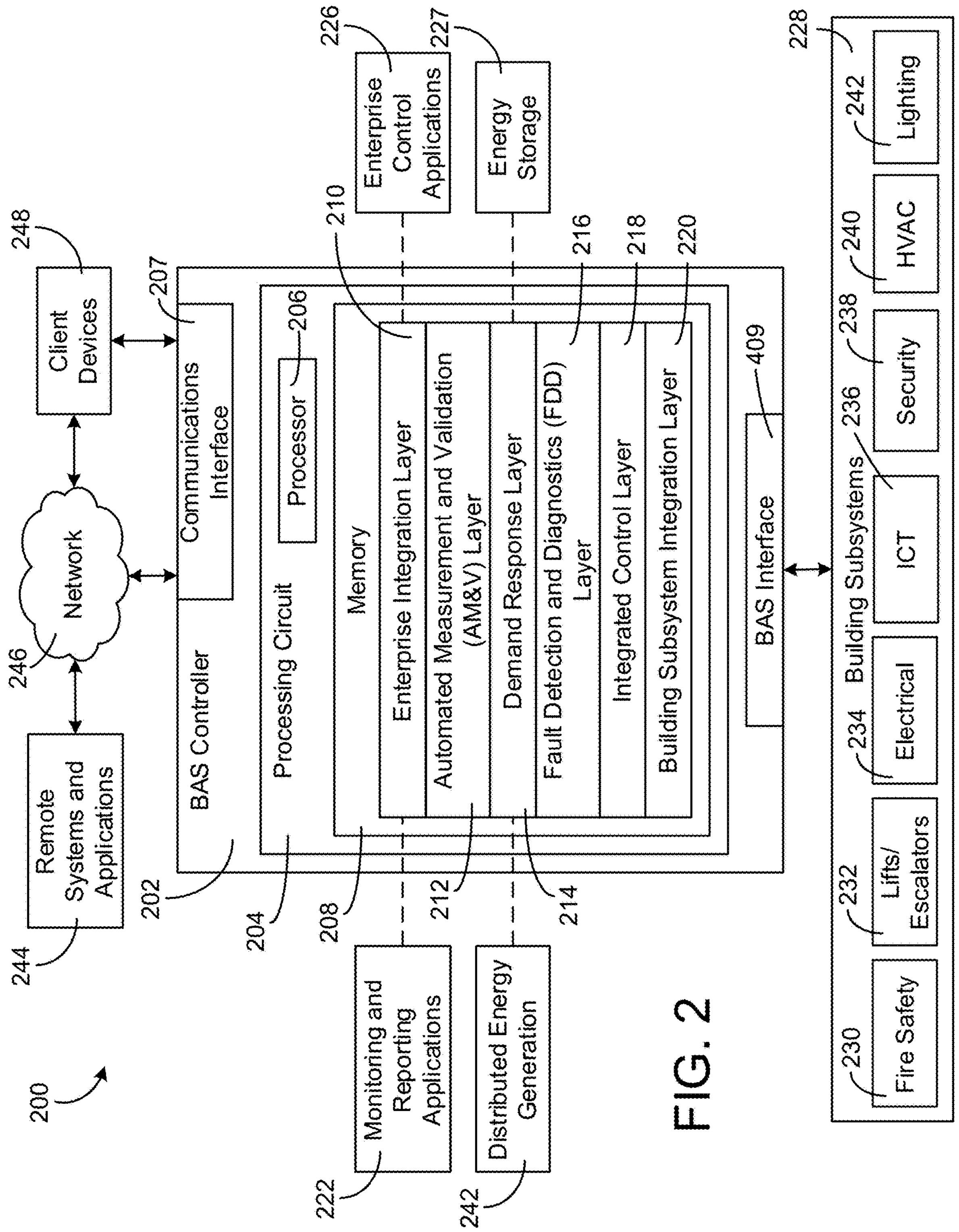
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 202 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 202 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 2 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data sources, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Figure 3:
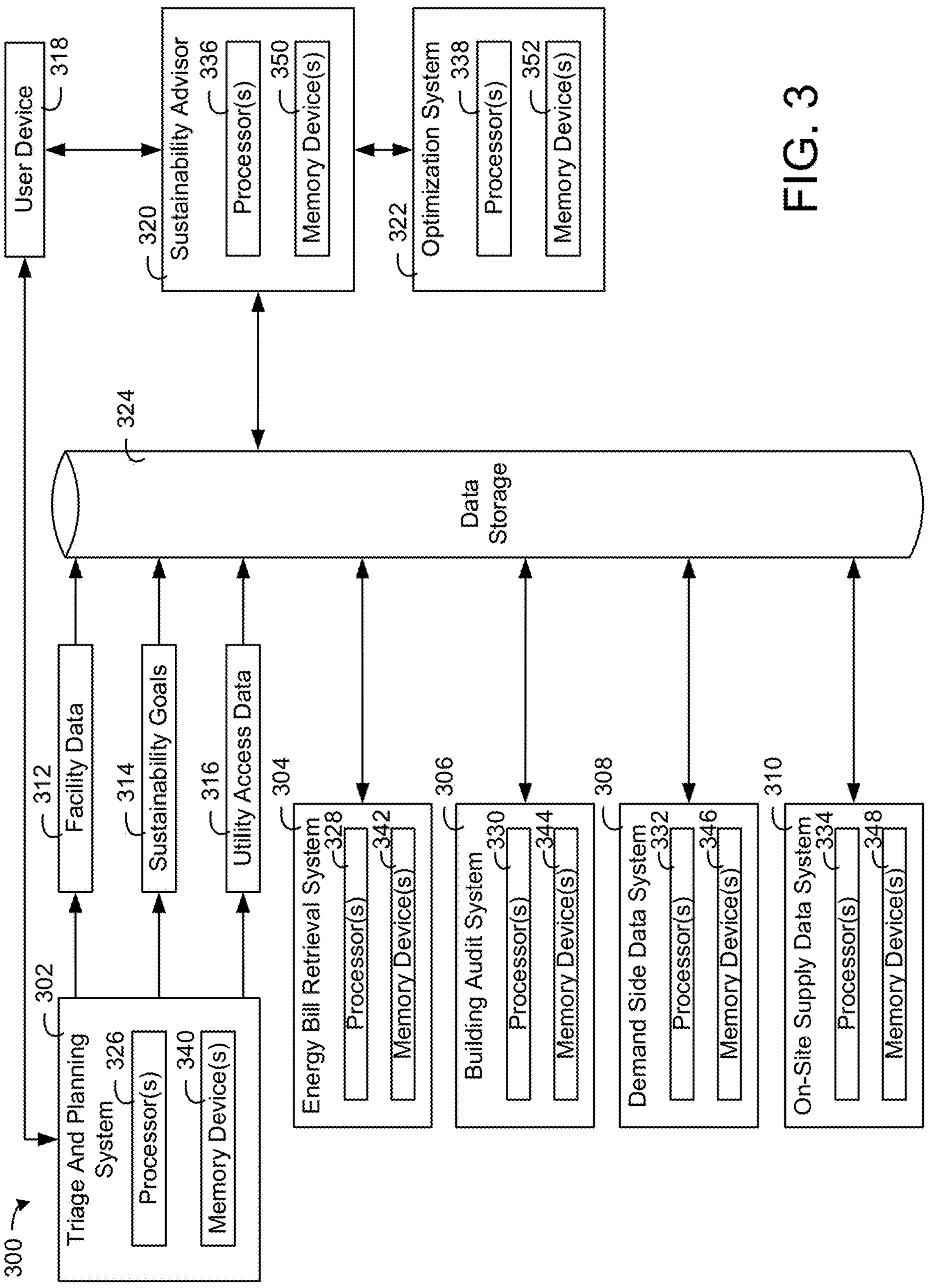
FIG. 3 is a block diagram of a system for sustainability optimization for planning a building, according to an exemplary embodiment.

Referring now to FIG. 3, a system 300 for sustainability optimization for planning a building is shown, according to an exemplary embodiment. The system 300 includes a triage and planning system 302 that is configured to interact with a user, via a user device 318. The system 300 further includes an energy bill retrieval system 304 configured to retrieve energy bills for a building. The system 300 further includes a building audit system 306 configured to collect and aggregate audit data for the building. The system 300 further includes a demand side data system 308 configured to collect demand related data from various building subsystems of a building.

Furthermore, the system 300 includes an on-site supply data system 310 configured to collect data regarding on-site supply systems of the building. Furthermore, the system 300 includes a sustainability advisor 320 configured to present sustainability related optimization results to a user via the user device 318. The system 300 includes an optimization system 322 configured to run an optimization that can identify optimal building retrofit decisions, building improvements, and/or operating plans.

The components of the system 300 can, in some embodiments, be run as instructions on one or more processors. The instructions can be stored in various memory devices. The processors can be the processors 326-338 and the memory devices can be the memory devices 340-352. The processors 326-338 can be implemented as a general purpose processor, an application specific integrated circuit (ASIC), one or more field programmable gate arrays (FPGAs), a group of processing components, or other suitable electronic processing components. The memory devices 340-352 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory devices 340-352 can be or include volatile memory and/or non-volatile memory.

The memory devices 340-352 can include object code components, script components, or any other type of information structure for supporting the various activities and information structures described in the present application. According to some embodiments, the memory devices 340-352 are communicably connected to the processors 326-338 and can include computer code for executing (e.g., by the processors 326-338) one or more processes of functionality described herein.

The system 300 includes data storage 324. The data storage 324 can be a database, a data warehouse, a data lake, a data lake-house, etc. The data storage 324 can store raw data, aggregated data, annotated data, formatted data, etc. The data storage 324 can act as a repository for all data collected from the triage and planning system 302, the energy bill retrieval system 304, the building audit system 306, the demand side data system 308, the on-site supply data system 310, the sustainability advisor 320, the optimization system 322, and/or any other system. In some embodiments, the data storage 324 can, in some embodiments, be a digital twin. The digital twin can, in some embodiments, be a graph data structure. The digital twin can be the digital twin described with reference to U.S. patent application Ser. No. 17/134,664 filed Dec. 28, 2020.

The triage and planning system 302 can provide one or more user interfaces to a user via the user device 318. The user interfaces can allow the user to interact and provide various pieces of information describing a building while the building is in a design phase and/or for an onboarding phase where a user first registers with the system 300 to begin sustainability planning for their building. The triage and planning system 302 can receive facility data 312, sustainability goals 314, and/or utility access data 316. The facility data 312 can describe a building facility, e.g., provide a name of the facility or campus, identify a number of buildings in the facility or campus, identify a use of each building, include a name of each building, indicate campus layout, indicate building size, indicate building square footage, indicate campus square footage, indicate geographic location, etc.

The triage and planning system 302 can receive sustainability goals 314 from the user devices 318. The sustainability goals 314 can be customer goals for their building with respect to energy reduction, carbon creation, carbon footprint, water usage reduction, switching to renewable energy, purchasing a certain number of renewable energy credits, etc. The goals can include target levels for energy consumption, carbon production, net zero carbon emissions, renewable energy, etc. The goals can further include timelines for the various target levels. For example, the timeline could be a period of time into the future, e.g., a number of days, weeks, months, years, decades, etc. The timeline can indicate a target date. For example, the timeline could be that a building is energy independent in the next forty years, or that the building is at a net-zero carbon emissions level in the next twenty five years. In some embodiments, the timelines for the sustainability goals can be returned to the user via the user device 318 with recommendations for meeting certain goals, e.g., a recommendation could be to extend a recommendation by five years (e.g., to 25 year) to hit a certain carbon emissions level which would be more financially feasible than attempting to meet the carbon emissions level in 20 years.

Figure 4:
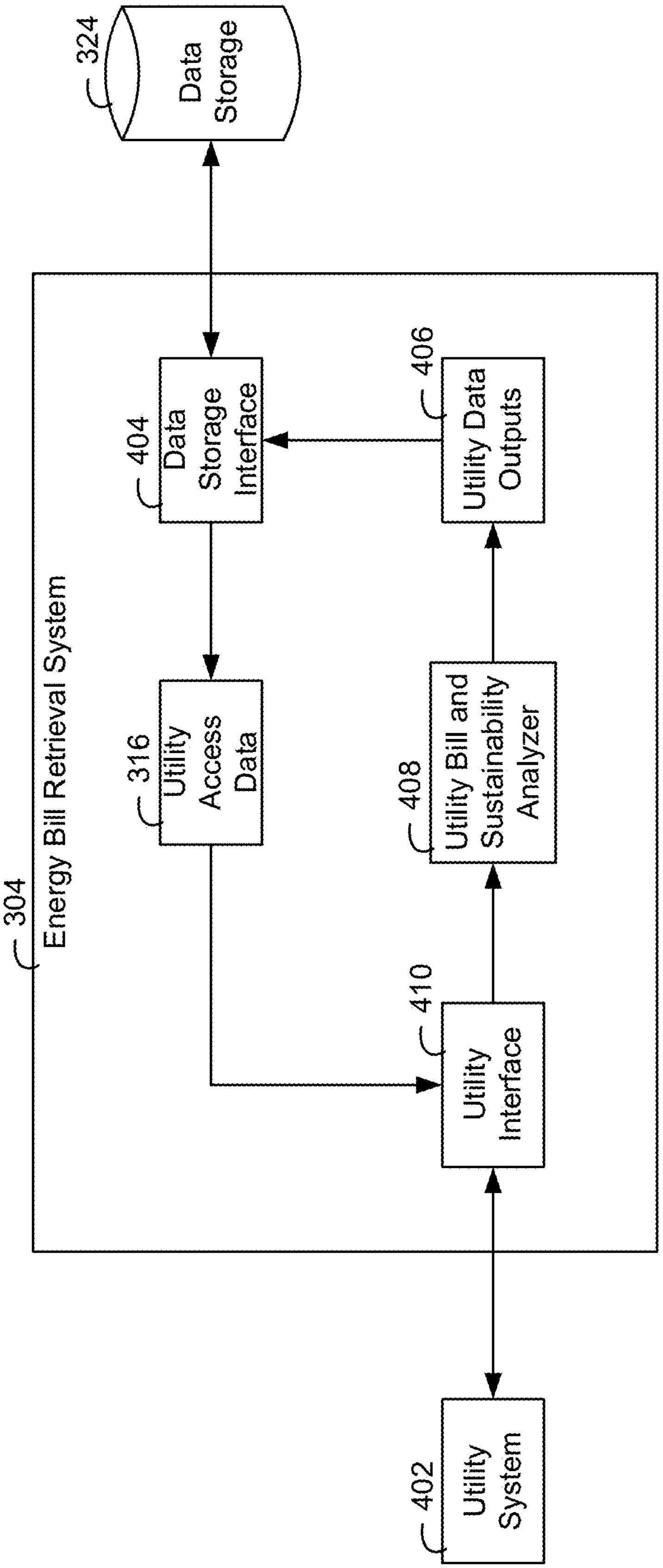
FIG. 4 is a block diagram of an energy bill retrieval system of the sustainability optimization system of FIG. 3, the energy bill retrieval system retrieving utility bills for the building, according to an exemplary embodiment.

Referring now to FIG. 4, energy bill retrieval system 304 of the system 300, the energy bill retrieval system retrieves utility bills for the building, according to an exemplary embodiment. The energy bill retrieval system 304 can be configured to retrieve utility access data 316 from the data storage 324 via a data storage interface 404. The bills can be electric bills, natural gas bills, water bills, etc. The data storage interface 404 can be an interface that integrates with the data storage 324 via an application programming interface (API) or otherwise exposes and API to external systems. A utility interface 410 can receive the utility access data 316 and retrieve utility bills from a utility system 402 based on the utility access data 316. The utility access data 316 can include a username, a login credential, an email address, an access code, an account number, a name of the energy provider, etc.

A utility interface 410 can, in some embodiments, integrate with the utility system 402 via the utility access data 316. The utility bills can include electricity consumption, water consumption, gas consumption, solar power electric consumption, wind turbine electric consumption, the utility interface 410 can provide the energy bills to a utility bill and sustainability analyzer 408. The analyzer 408 can run various analytics on the utility bills.

For example, the analyzer 408 could identify invoice data, perform an audit on utility bill data, and/or perform an analysis on energy rates and/or tariffs for the energy (e.g., environmental penalties for various forms of energy). The analyzer 408 can identify an energy consumption baseline for the building, identify benchmarking for the building (e.g., compare the baseline of the building to other peer buildings or an industry to determine a benchmark index), determine facility key performance indicators (KPIs), etc.

The analyzer 408 can identify sustainability data, for example, a carbon emissions baseline for the building (e.g., carbon emissions produced from natural gas or carbon emissions from electricity consumption), sustainability benchmarking (e.g., a peer comparison of the emissions baseline for the building against other buildings), renewable energy usage tracking, etc. The analyzer 408 can generate sustainability reports (e.g., an indication between a baseline emissions and a current emissions to show sustainability tracking), management and verification (M&V) reports, etc. The results of the analysis performed by the analyzer 408 can be the utility data outputs 406 which can be stored in the data storage 324 by the data storage interface 404. In some embodiments, the M&V reporting could illustrate savings between a baseline and an improvement for the building. For example, the M&V reporting could indicate a carbon emissions reduction that results (compared to a baseline) from a particular FIM.

Figure 5:
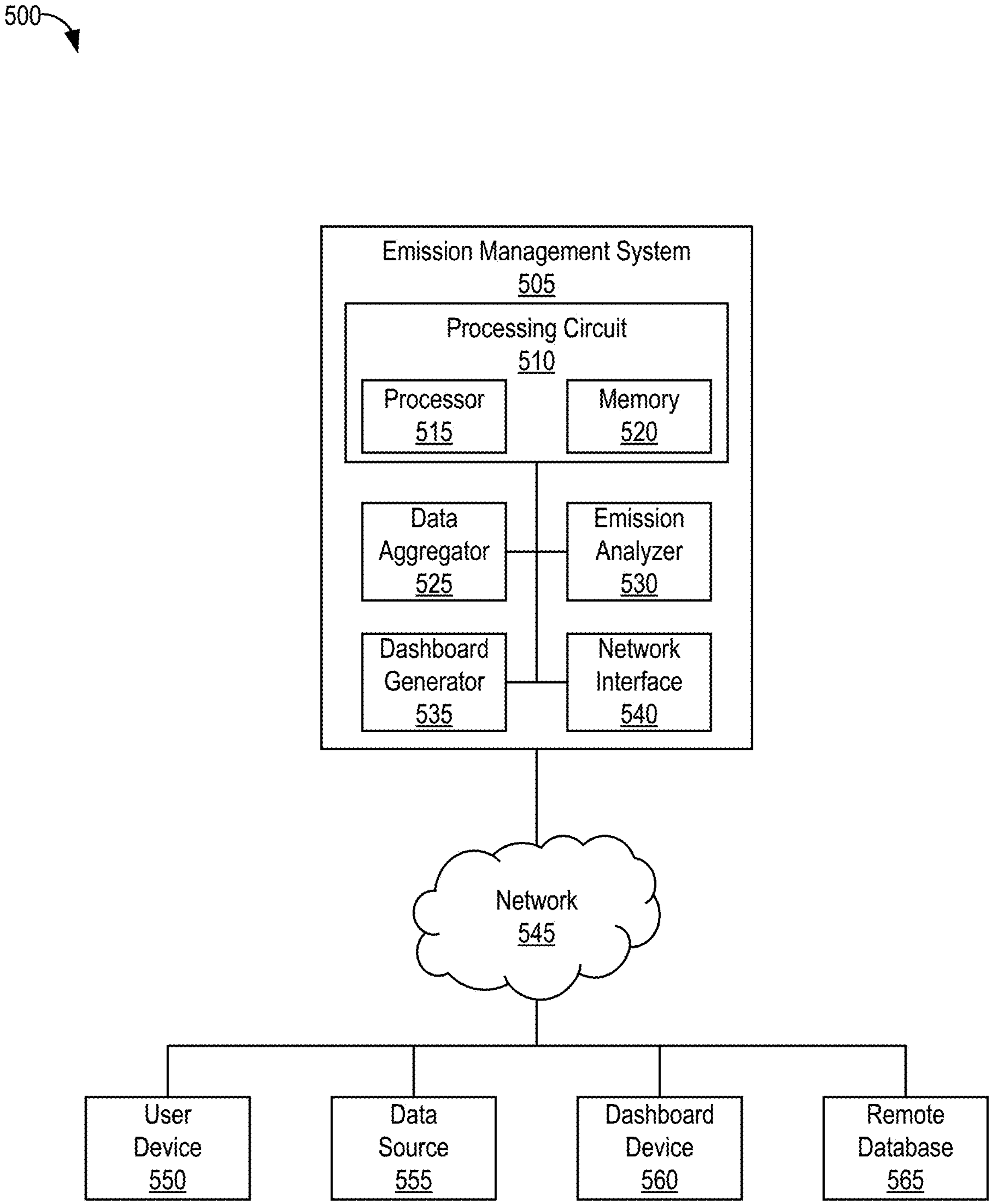
FIG. 5 is a block diagram of a system for use in emission value generation for a regional area, according to an exemplary embodiment.

FIG. 5 depicts a block diagram of a system 500, according to some embodiments. Each system and/or component of the system 500 can include one or more processors, memory, network interfaces, communication interfaces, and/or user interfaces. Memory can store programming logic that, when executed by the processors, controls the operation of the corresponding computing system or device. Memory can also store data in databases. The network interfaces can allow the systems and/or components of the system 500 to communicate wirelessly. The communication interfaces can include wired and/or wireless communication interfaces and the systems and/or components of the system 500 can be connected via the communication interfaces. The various components in the system 500 can be implemented via hardware (e.g., circuitry), software (e.g., executable code), or any combination thereof. Systems, devices, and components in FIG. 5 can be added, deleted, integrated, separated, and/or rearranged.

The system 500 can include at least one Emission Management System (EMS) 505, at least one network 545, at least one user device 550, at least one data source 555, at least one dashboard device 560, and at least one remote database 565. In some embodiments, at least one component of the system 500 can be and/or include at least one system, device, and/or component described herein. For example, the user devices 550 can include the user devices 318. In some embodiments, at least one component of the system 500 can perform similar functionality to that of at least one system, device, and/or component described herein. For example, the EMS 505 can perform similar functionality to that of the energy bill retrieval system 304. In some embodiments, the EMS 505 can include the emission monitoring system described herein. The EMS 505 can provide some of the technical solutions described herein.

The network 545 can be and/or include a local area network (LAN), wide area network (WAN), telephone network (such as the Public Switched Telephone Network (PSTN)), Controller Area Network (CAN), wireless link, intranet, the Internet, a cellular network, and/or combinations thereof. The user devices 550 can be and/or include at least one of a mobile computing device, a desktop computer, a smartphone, a tablet, a smart watch, a smart sensor, and/or any other device that can facilitate providing, receiving, displaying and/or otherwise interacting with content (e.g., webpages, mobile applications, etc.).

In some embodiments, an operator of the user devices 550 can perform various actions and/or access various types of information. The information can be provided over the network 545 (e.g., the Internet, LAN, WAN, cellular, etc.). The user devices 550 can perform similar functionality to that of at least one component of the system 500. For example, the user devices 550 can perform similar functionality to that of the dashboard device 560. The user devices 550 can include an application to receive information, display information, and/or receive user interactions with content displayed by the user devices 550.

The data sources 555 can be and/or include at least one of the various data sources described herein. For example, the data sources 555 can include the utility system 402. The data sources 555 can include at least one of publicly accessible emission information, a governmental body, a utility company, and/or a regulatory entity. For example, the data sources 555 can include an electric company that provides electricity to a regional area. In some embodiments, the data sources 555 can be and/or include regional sources, national sources, continent sources, and/or global sources. For example, the data sources 555 can be a city government body (e.g., a city's government division in charge of overseeing utility information).

The dashboard devices 560 can be and/or include at least one of a screen, a monitor, a visual display device, a touchscreen display, a television, a video display, a liquid crystal display (LCD), a light emitting diode (LED) display, a mobile device, a kiosk, a digital terminal, and/or among other possible displays and/or devices. For example, the dashboard devices 560 can be touchscreen displays that include a resistive touchscreen that can receive user input via interactions (e.g., touches) with the touchscreen. In some embodiments, the dashboard devices 560 can be located within and/or otherwise positioned proximate to a command center. In some embodiments, the dashboard devices 560 can be in communication with one another such that the dashboard devices 560 can display a continuous user interface (e.g., a single user interface) across the dashboard devices 560. In some embodiments, the dashboard devices 560 can display, present, and/or otherwise provide a plurality of user interfaces and the plurality of user interfaces can be provided across given dashboard devices 560.

The remote database 565 can be and/or include at least one of a computing device, a remote server, a server bank, a remote device, and/or among other possible computer hardware and/or computer software. For example, the remote database 565 can include a server bank and the server bank can store, keep, maintain, and/or otherwise hold the various types of information described herein. In some embodiments, the remote database 565 may house and/or otherwise implement at least one of the various systems, devices, and/or components described herein. For example, the remote database 565 can house the system 300. In some embodiments, the remote database 565 can include, store, maintain, and/or otherwise host the EMS 505. For example, the EMS 505 may be distributed across one or more serves (e.g., the remote database 565).

The EMS 505 can include at least one processing circuit 510, at least one data aggregator 525, at least one emission analyzer 530, at least one dashboard generator 535, and at least one network interface 540. The processing circuit 510 can include at least one processor 515 and at least one memory 520. The processing circuit 510 and/or a component thereof (e.g., the processors 515 and memory 520) can perform similar functionality to that of the EMS 505 and/or a component thereof. For example, memory 520 can store programming logic that, when executed by the processors 515, cause the processors 515 to perform functionality similar to the EMS 505 and/or a component thereof.

The network interface 540 can be and/or include at least one of network communication devices, network interfaces, and/or other possible communication interfaces. The network interface 540 can be and/or include wired or wireless communications interfaces (e.g., jacks, antennas, transmitters, receivers, transceivers, wire terminals, etc.) for conducting data communications with various systems, devices, and/or components described herein. The network interface 540 can be direct (e.g., local wired or wireless communications) and/or via a communications network (e.g., the network 545). For example, the network interface 540 can include an Ethernet card and port for sending and receiving data via an Ethernet-based communications link or network. The network interface 540 can also include a Wi-Fi transceiver for communicating via a wireless communications network (e.g., the network 545). The network interface 540 can include a power line communications interface. The network interface 540 can include an Ethernet interface, a USB interface, a serial communications interface, and/or a parallel communications interface.

The network interface 540 can receive, from a plurality of data sources, emission information corresponding to a regional area. For example, the network interface 540 can receive emission information from the data sources 555. In some embodiments, the regional area can be and/or include at least one of a city, a town, a region, a geographic location, a county, a country, and/or a continent. For example, the regional area can be a city. The emission information received by the network interface 540 can include the various types of information described herein. For example, the emission information can include utility bills for various entities located within and/or corresponding to the regional area. The network interface 540 can provide the emission information to at least one component of the system 500. For example, the network interface 540 can provide the emission information to the dashboard devices 560.

The data aggregator 525 can receive, from the network interface 540, the emission information corresponding to the regional area. The data aggregator 525 can extract, from the emission information, a plurality of emission sources associated with the regional area. For example, the data aggregator 525 can extract a plurality of buildings from the emission information. The plurality of emission sources can be and/or include at least one of building emission sources, transportation emission sources, and/or industry emission sources. For example, the plurality of emission sources may include vehicle transportation associated with the regional area.

In some embodiments, the network interface 540 can receive, from the data sources 555, a continuous and/or semi-continuous stream of information (e.g., the emission information). In some embodiments, the data aggregator 525 can extract, in conjunction with the network interface 540 receiving the emission information, the plurality of emission sources. For example, the data aggregator 525 can extract the plurality of emission sources as the network interface 540 is receiving the emission information. In some embodiments, the data aggregator 525 can monitor the emission information to identify changes to the emission information. For example, the data aggregator 525 can detect when emission sources are added and/or removed from the emission information (e.g., a new building was built in the regional area, a train station was decommissioned in the regional area, etc.).

The emission analyzer 530 can determine, using the emission information and predetermined criteria for regional emissions, a regional emission value for the regional area. For example, the emission analyzer 530 can identify a total amount of carbon emissions for the regional area and the emission analyzer 530 can compare the total amount of carbon emissions to a predetermined criteria for carbon emissions (e.g., a predetermined criteria for regional emissions) to determine the regional emission value for the regional area.

In some embodiments, the regional emission value for the regional area can be and/or include at least one of a percentile ranking, a total value (e.g., a total amount of emissions produced and/or associated with the regional area), a mean score (e.g., an average amount for the plurality of emission sources of the regional area), and/or among various other possible qualitative and/or quantitative values. For example, the regional emission value for the regional area may be a combination of various emission values for various emission types (e.g., energy consumption, carbon emission, greenhouse gas emission, water consumption, waste production, etc.). In some embodiments, the regional emission value may be a combination of carbon emission values for the regional area (e.g., how much carbon is emitted by the plurality of emission sources of the regional area).

The emission analyzer 530 can identify, based on the regional emission value for the regional area, a plurality of emission impacts for the plurality of emission sources on the regional emission value for the regional area. For example, the emission analyzer 530 can determine emission values for the plurality of emission sources and the emission analyzer 530 can use a difference between the emission values and the regional emission value to identify the plurality of emission impacts. As another example, the plurality of emission impacts can be and/or include a percentage contribution for given emission sources for the plurality of emission sources (e.g., how much of the regional emission value is a result of emissions from given emission sources). In some embodiments, given emission impacts can indicate a contribution, by a given emission source, towards the regional emission value for the regional area. For example, a first emission impact of the plurality of emission impacts may indicate a contribution by a first emission source towards the regional emission value (e.g., a percent carbon emission value for the first emission source, a percent energy consumption by the first emission source, etc.).

The emission analyzer 530 can provide the plurality of emission impacts to the dashboard generator 535. The dashboard generator 535 can generate, responsive to identification of the plurality of emission impacts, a regional dashboard. The regional dashboard can be displayed by the dashboard devices 560. For example, the dashboard devices 560 can provide, display, and/or otherwise produce a plurality of user interfaces and the plurality of user interfaces can include the regional dashboard. In some embodiments, the regional dashboard can be provided and/or otherwise visible within the command center described herein.

In some embodiments, the regional dashboard can include a plurality of graphical representations. For example, the regional dashboard can include at least one of icons, windows, tabs, dropdowns, selectable elements, text boxes, social media feeds, scrolling trackbars, and/or among other possible combinations and/or alternatives. The plurality of graphical representations can include at least one of graphical representations to identify the regional emission value for the regional area, graphical representations to identify respective emission sources of the plurality of emission sources, graphical representations to identify the plurality of emission impacts, and/or graphical representations to identify a plurality of actions to adjust at least one of the regional emission value for the regional area or at least one emission impact of the plurality of emission impacts.

The data aggregator 525 can monitor, responsive to execution of at least one action, the regional emission value for the regional area. For example, the at least one action may include the regional area installing solar panels throughout the regional area and the data aggregator 525 can monitor the regional emission value to detect an impact on carbon emissions associated with electricity produced by a utility company (e.g., did installing solar panels decrease the carbon emissions associated with the utility company).

The network interface 540 can receive subsequent emission information. For example, the network interface 540 can receive the subsequent emission information responsive to execution of the at least one action. The network interface 540 can provide the subsequent emission information to the data aggregator 525. The data aggregator 525 can detect, based on the subsequent emission information, a change in the regional emission value for the regional area. For example, the data aggregator 525 can detect that an amount of energy produced by the utility company has decreased responsive to installing the solar panels throughout the regional area.

The data aggregator 525 can provide, to the dashboard generator 535, the change in the regional emission value for the regional area. The dashboard generator 535 can update, responsive to detection of the change in the regional emission value for the regional area, the regional dashboard to reflect the change in the regional emission value for the regional area. For example, the dashboard can include a regional view associated with the regional area and the regional view can be updated to include the change in the regional emission value for the regional area.

In some embodiments, the plurality of actions can include at least one of Energy Conservation Measures (ECMs), Facility Improvement Measures (FIMs), infrastructure project recommendations, emission criteria recommendations, and/or among various possible combinations. For example, the plurality of actions can include at least one of retrofitting municipal buildings with solar panels, adjusting a carbon emission quota for various emission sources associated with the regional area, establishing equipment setpoint recommendations for various emission sources associated with the regional area, providing building specification recommendations for planned and/or currently undergoing construction of buildings within the regional area.

As a non-limiting example, the plurality of actions can include rebates (e.g., promotions and/or incentives to offer to residents of the regional area), building retrofit installations for various buildings operated by the regional area, and/or generating carbon emission quotas for various types of buildings. In some embodiments, the plurality of actions can be provided, via the user devices 550, to at least one official and/or designated individual associated with the regional area. For example, the plurality of actions can be provided to individuals associated with a county board and/or a county commission.

In some embodiments, the EMS 505 can receive indications of selected given actions of the plurality of actions generated by the EMS 505. For example, the plurality of actions can be provided via user interfaces and the operator of the device displaying the user interface may select and/or otherwise indicate at least one action. The selected given actions can be provided to the various components of the EMS 505. For example, the selected given actions can be provided to the emission analyzer 530.

The dashboard generator 535 can execute, responsive to receipt of a selection of at least one action of the plurality actions, the at least one action of the plurality of actions. For example, the at least one action can include scheduling an installation of solar panels for various buildings disposed across the regional area. The execution of the at least one action can also include establishing equipment setpoint standards for various municipal buildings disposed across the regional area.

The emission analyzer 530 can determine, responsive to execution of the at least one action of the plurality of actions, a change in the regional emission value for the regional area. For example, the emission analyzer 530 can determine that an amount of water consumption in municipal buildings has decreased responsive to replacing toilets and sinks with water efficient toilets and sinks. The emission analyzer 530 can also determine a percent impact (e.g., by what percentage was the regional emission value for the regional area impacted).

The data aggregator 525 can update, based on the change in the regional emission value for the regional area, an Artificial Intelligence (AI) model. For example, the EMS 505 and/or various components thereof may implement and/or execute AI and/or Machine Learning (ML) models to perform various functions and the data aggregator 525 can update the AI and/or ML models based on the change in the regional emission value for the regional area.

In some embodiments, the EMS 505 may include and/or access a ML Model. For example, the remote database 565 may house and/or implement one or more ML models and the EMS 505 may access and/or interact with the ML models housed by the remote database 565. As another example, memory 520 may include and/or store one or more ML models and the various components of the EMS 505 may access and/or utilize the ML models stored by memory 520.

In some embodiments, the one or more ML models may include models that are trained using one or more various techniques. For example, the ML models may be trained with and/or using at least one of supervised learning, unsupervised learning, reinforcement learning, random forest, regression analysis, cluster analysis, and/or among other possible training techniques. In some embodiments, the ML models may include Artificial intelligence model. For example, the ML models may include Generative Artificial Intelligence (GAI) models. As another example, the ML models may include and/or implement various deep learning architectures and/or techniques. For example, the ML models may include a transformer.

In some embodiments, the EMS 505 may implement one or more GAI models to extract and/or identify relationships between actions taken by at least one of buildings, city's municipalities, regional areas, and/or countries and the corresponding impacts and/or changes on emissions. For example, the EMS 505 may, via one or more GAI models, extract information from published articles (e.g., journals, web posts, peer-reviewed studies, government programs, etc.) that show energy reduction that resulted from use of a given number of solar panels for a building of "X" size. To continue this example, the EMS 505 may, via the GAI models, extract knowledge to use when generating recommendations for building of "X" size. As another example, the EMS may, via the GAI model, implement the extracted knowledge when providing recommendations that are "Y" size based on one or more adjusted to correlations discovered for the building of "X" size.

In some embodiments, the GAI models may automatically execute and/or implement recommendations and/or actions as the EMS 505 is receiving emission information. For example, the network interface 540 may receive a first set of emission information and the GAI models may generate and implement actions that address the first set of emission information. To continue this example, the GAI models may generate equipment setpoints for one or more pieces of building equipment that are associated with the first set of emission information.

In some embodiments, the GAI models may provide examples and/or recommendations based on what other cities have implemented. For example, the GAI models may determine that city "A" and city "B" have one or more similarities (e.g., population, geographic proximity, density, landmass, etc.) and the GAI models may provide recommendations for city "A" based on an analysis of emission adjusts that resulted by one or more actions performed by city "B."

In some embodiments, the GAI models may generate correlations between multiple factors and/or elements. For example, the GAI models may correlate that a city's high transportation rate (e.g., number of vehicles that travel throughout the city) along with the city's low electric vehicle utilization (e.g., how many of the vehicles are electric vehicles) is contributing to the city's high carbon emission values. In some embodiments, the GAI model may generate recommendations to address the low electric vehicle utilization. For example, the GAI model may provide and/or generate recommendations that include rebates and/or incentives for individuals to purchase and/or travel via electric vehicles.

In some embodiments, the EMS 505 may generate and/or provide the regional dashboard based on one or more industries. For example, the EMS 505 may generate a regional dashboard that pertains to buildings of a given regional area and where the buildings are associated with a given industry. Stated otherwise, the EMS 505 may generate a regional dashboard with buildings that are associated with manufacturing. As another example, the EMS 505 may generate a regional dashboard with buildings associated with transportation.

In some embodiments, the regional dashboard may include one or more industry views. For example, the regional dashboard may include an automation view. As another example, the regional dashboard may include a manufacturing view. In some embodiments, the industry view may also identify and/or indicate buildings based on a role within the region. For example, a building that perform desalination (e.g., desalination plant) may receive carbon credits and/or may be analyzed based on different factors given the importance of the desalination plant for the region.

In some embodiments, the regional dashboard may also include one or more levels or view. For example, the regional dashboard may include a country view, a region view, a city view, and/or a building view. In some embodiments, the various views may include corresponding information. For example, the country view may provide emission information corresponding to the country. As another example, the building view may provide emission information corresponding to the building.

In some embodiments, the regional dashboard may include one or more elements. For example, the regional dashboard may include floating icons that correspond to heat maps (e.g., carbon emissions, energy consumption, etc.) for a given region, a given country, a given building, and/or a given city. As another example, the elements may also include building specific metrics (e.g., carbon emissions for a given building, energy consumption for a given building, etc.) In some embodiments, the elements may include one or more indemnifying features. For example, the elements may be colored (e.g., a first element is red, and a second element is green). As another example, the elements may have different shapes (e.g., a first element is a square and a second element is a circle).

The network interface 540 can receive, from the data sources 555, subsequent emission information pertaining to a plurality of regional areas. For example, the network interface 540 can receive emission information for various given counties within a given state. The network interface 540 can also receive emission information for given states and/or given countries. The subsequent emission information may include the various emission information described herein.

The emission analyzer 530 can determine, based on the subsequent emission information, a plurality of regional emission values for the plurality of regional areas. For example, the emission analyzer 530 can analyze, review, and/or examine the subsequent emission information to determine given emission values and/or emission amounts for the plurality of regional areas. The plurality of regional emission values can include similar information to that of the regional emission value described herein. In some embodiments, the plurality of regional emission values may include different regional emission values and/or emission types. For example, a first regional emission value for a first regional area may include an emission value for energy consumption and a second regional emission value for a second regional area may include an emission value for carbon emission.

The emission analyzer 530 can generate, based on the regional emission value for the regional area and the plurality of regional emission values for the plurality of regional areas, a list. For example, the emission analyzer 530 can generate a record and/or an index of the various regional emission values for the various regional areas. The list can include a plurality of tiers. For example, the list can include tiers corresponding to various given emission values (e.g., regional areas having a first given emission value are located and/or placed in a first given tier and regional areas having a second given emission value are located and/or placed in a second given tier.

The dashboard generator 535 can update the regional dashboard to include the list. For example, the dashboard generator 535 can display, provide, and/or otherwise present a graphical representation of the list and/or the emission values and corresponding regional areas. The regional dashboard can include a plurality of portions and a given tier of the plurality of tiers can be included in a given portion of the plurality of portions. The given tiers can include a given regional area of the plurality of regional areas and the given tiers can an emission score for the given regional area.

Regional Dashboard

Figure 6:
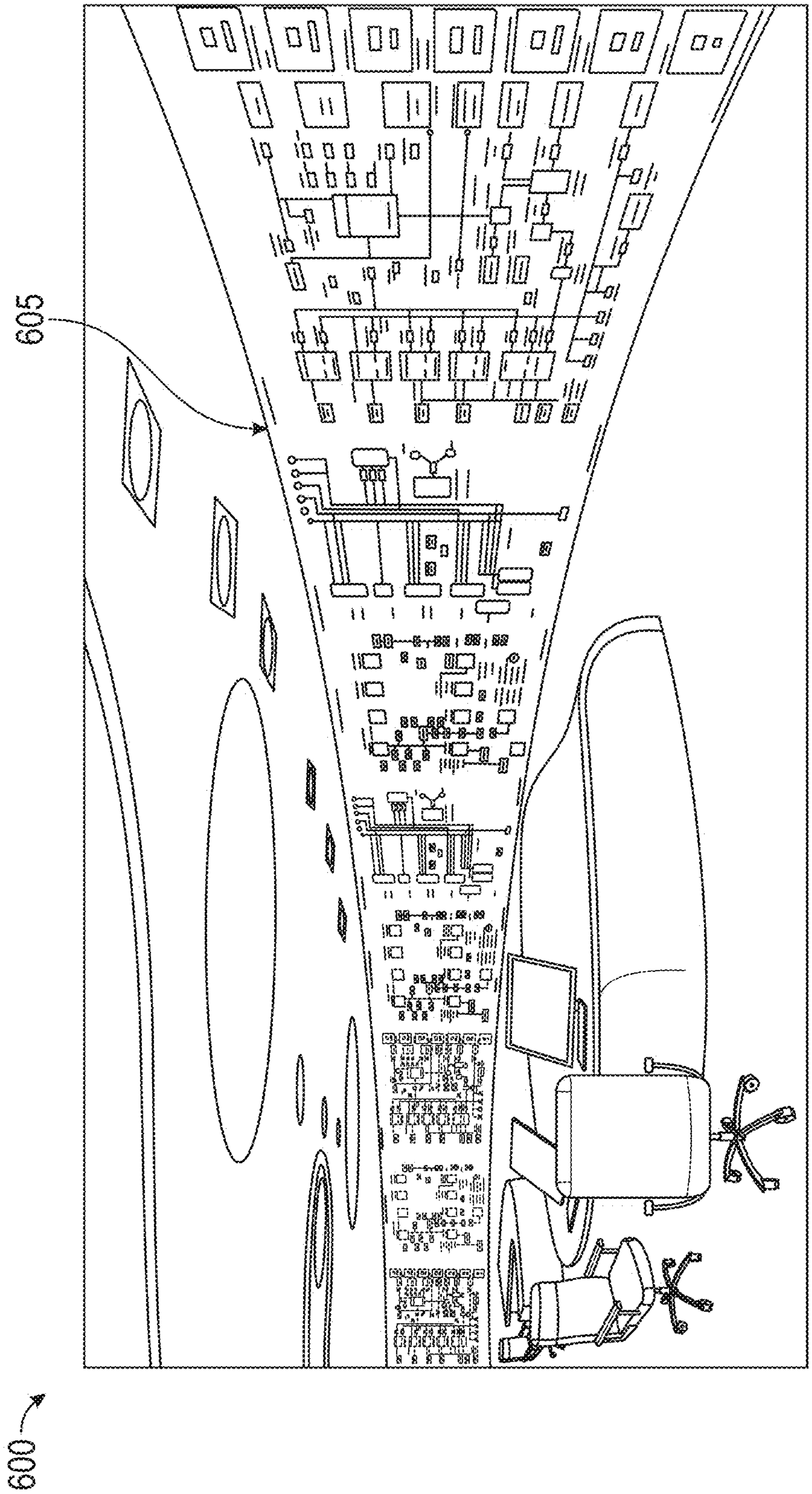
FIG. 6 is a perspective view of a command center including a regional dashboard, according to an exemplary embodiment.

FIG. 6 depicts a perspective view of a command center 600, according to some embodiments. The command center 600 can be and/or include the command center described herein. In some embodiments, the command center 600 can implement, execute, and/or otherwise house the EMS 505. In some embodiments, the command center 600 can implement, execute, and/or otherwise house the remote database 565. The command center 600 can include at least one dashboard 605. The dashboard 605 can be and/or include the regional dashboard described herein. In some embodiments, the dashboard 605 can include and/or be implemented as a plurality of display devices. For example, the dashboard 605 can include the dashboard devices 560. The dashboard 605 can provide, present, and/or otherwise display at least one user interface. For example, the dashboard 605 can display the user interfaces via the dashboard devices 560. In some embodiments, an operator and/or a user of the dashboard 605 can interface with, interact with, and/or otherwise engage with the dashboard 605 to adjust and/or change given information displayed by the user interfaces. For example, the dashboard devices 560 can include touch-screens and an operator the dashboard devices 560 can engage (e.g., touch) the dashboard devices 560 to change information provided by the user interface. It should be understood that, in various embodiments, the information shown on the example dashboard views provided here, and/or other various types of information described herein, could be shown on a single dashboard (e.g., a large wall user interface configured to display a large dashboard) and/or could be provided as separate dashboards/interfaces, such as on a plurality of user devices. In some implementations, portions of the information may be provided on different displays/user interfaces based, for example, in permissions or roles of the user of the display/interface.

Figure 7:
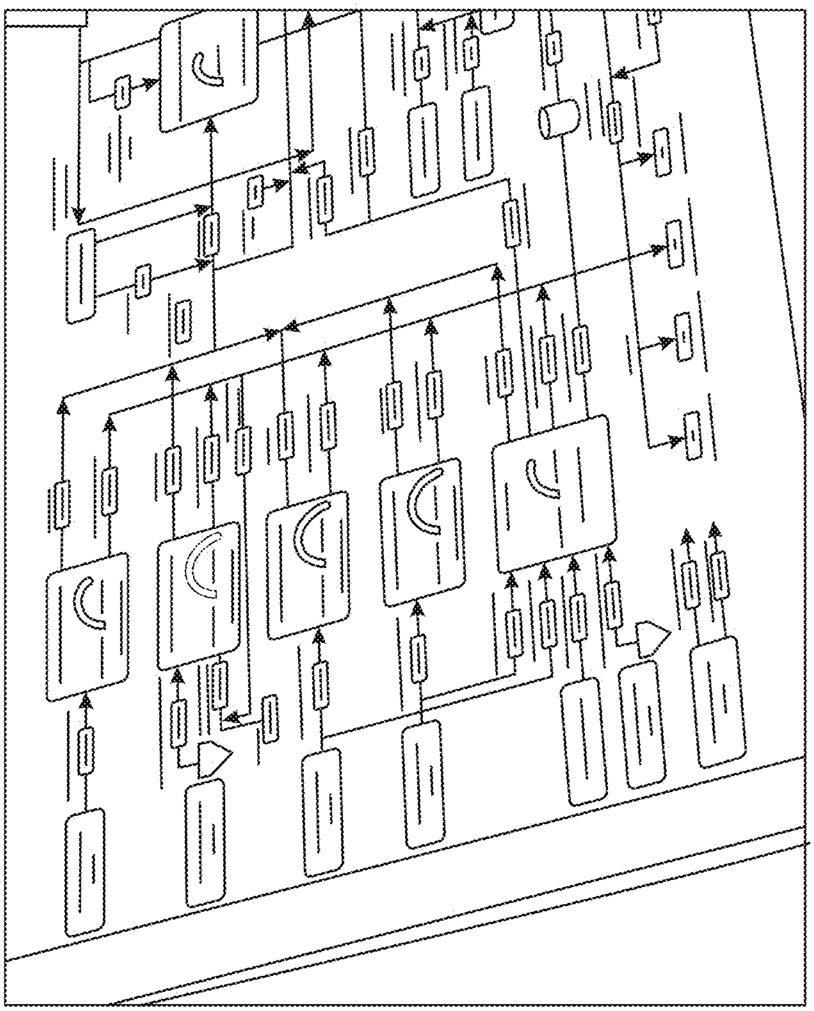
FIG. 7 is a perspective view of a dashboard device included in the command center illustrated in FIG. 6, according to an exemplary embodiment.

FIG. 7 depicts a perspective view of the dashboard devices 560, according to some embodiments. The dashboard devices 560 can be housed, located, positioned, and/or otherwise placed within and/or proximate to the command center 600. FIG. 7 depicts an example of the dashboard devices 560 implemented as a monitor. The dashboard devices 560 can be in communication with the dashboard 605. For example, a first dashboard device 560 can be implemented as a monitor located on a desk disposed within the command center 600 and a second dashboard device 560 can be implemented as the dashboard 605. The first dashboard device 560 and the second dashboard device 560 can interface with, interact with, and/or otherwise communicate with one another. In some embodiments, the dashboard devices 560 can provide an extension of the dashboard 605. For example, the dashboard 605 can include a first plurality of dashboard devices 560 and the command center 600 can include a second plurality of dashboard devices 560 located at various workstations of the command center. To continue this example, the first plurality of dashboard devices 560 can produce and/or otherwise provide the dashboard 605 and the second plurality of dashboard devices 560 can provide various portions of the dashboard 605 to operators of the second plurality of dashboard devices 560.

User Interfaces

The various display devices (e.g., the dashboard devices 560, the user devices 550, etc.) can provide, produce, generate, and/or otherwise display at least one user interface. The user interfaces displayed by the various display devices can include the various user interfaces described herein. In some embodiments, the various user interfaces described herein can be implemented as and/or otherwise combined into a singular and/or uniform user interface. For example, a first user interface and a second user interface may be combined into a singular user interface and the singular user interface may be displayed across a given number of display devices. In some embodiments, the dashboard 605 can display and/or provide a plurality of user interfaces across a plurality of display devices. For example, a first display device can display a first user interface and a second display device can display a second user interface. In some embodiments, the user interface displayed by the dashboard 605 can include the first user interface and the second user interface. In some embodiments, the various user interfaces described herein can be provided and/or display as pop-up windows, overlays, scrolling user interfaces, and/or various combinations. For example, a first user interface may be overlayed a second user interface.

Figure 8:
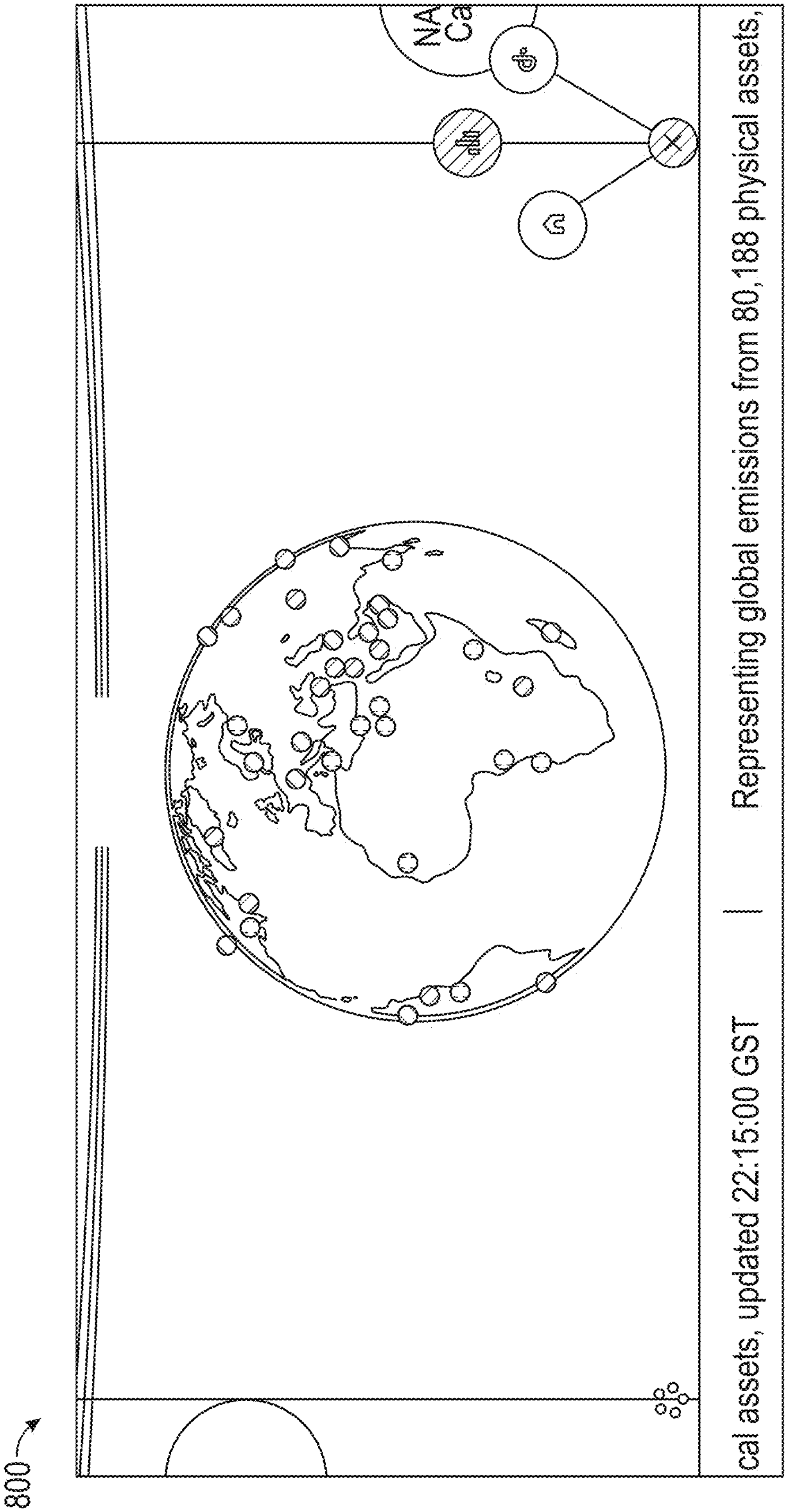
FIG. 8 is a user interface including a global view of emission information, according to an exemplary embodiment.

FIG. 8 depicts a user interface 800, according to some embodiments. The user interface 800 can be presented, provided, and/or display within the dashboard 605. For example, the dashboard devices 560 can display the user interface 800. The user interface 800 can be displayed and/or provided across a given number of devices. For example, the user interface 800 can be displayed across a first dashboard device 560 and a second dashboard device 560. The user interface 800 can include at least one portion. For example, the user interface 800 is shown to include a left portion, a center portion, a right portion, and a bottom portion. In some embodiments, the left portion can include at least one moving sphere. The moving spheres can provide information pertaining to given carbon dioxide emission topics. For example, the moving spheres can include quick links to information pertaining to carbon dioxide information.

In some embodiments, the center portion can include a global world view of emission information. The emission information can include information obtained and/or otherwise collected by the EMS 505. An operator and/or a user of the dashboard 605 can interact with the dashboard 605 to adjust, move, and/or otherwise change the global world view. In some embodiments, the center portion can include selectable and/or clickable elements and the elements can correspond to various countries. For example, the operator can select an element corresponding to a given country to then see emission information pertaining to the given country.

In some embodiments, the right portion can include a news feed of various articles pertaining to emissions. For example, the right portion can include news articles pertaining to carbon emissions. In some embodiments, the right portion can include news feed pertaining to a given country responsive to an operator selecting the given country in the center portion of the user interface 800. In some embodiments, the bottom portion can be and/or include a universal news title ticker that provides real-time updates in a text format.

The user interface 800 can include at least one navigation and/or view element. For example, the user interface 800 can include a selectable element that can change the global view to a regional view. FIG. 8 depicts an example of the user interface 800 including five dots disposed proximate to the left portion of the user interface 800. The operator interfacing with the five dots may result in the user interface 800 displaying a universal navigation window (e.g., various navigation elements may be displayed). FIG. 8 depicts an example of the user interface 800 including four circles disposed proximate to the right portion of the user interface 800. The operator interfacing with at least one of the four circles may change the view and/or the information displayed in the user interface 800.

Figure 9:
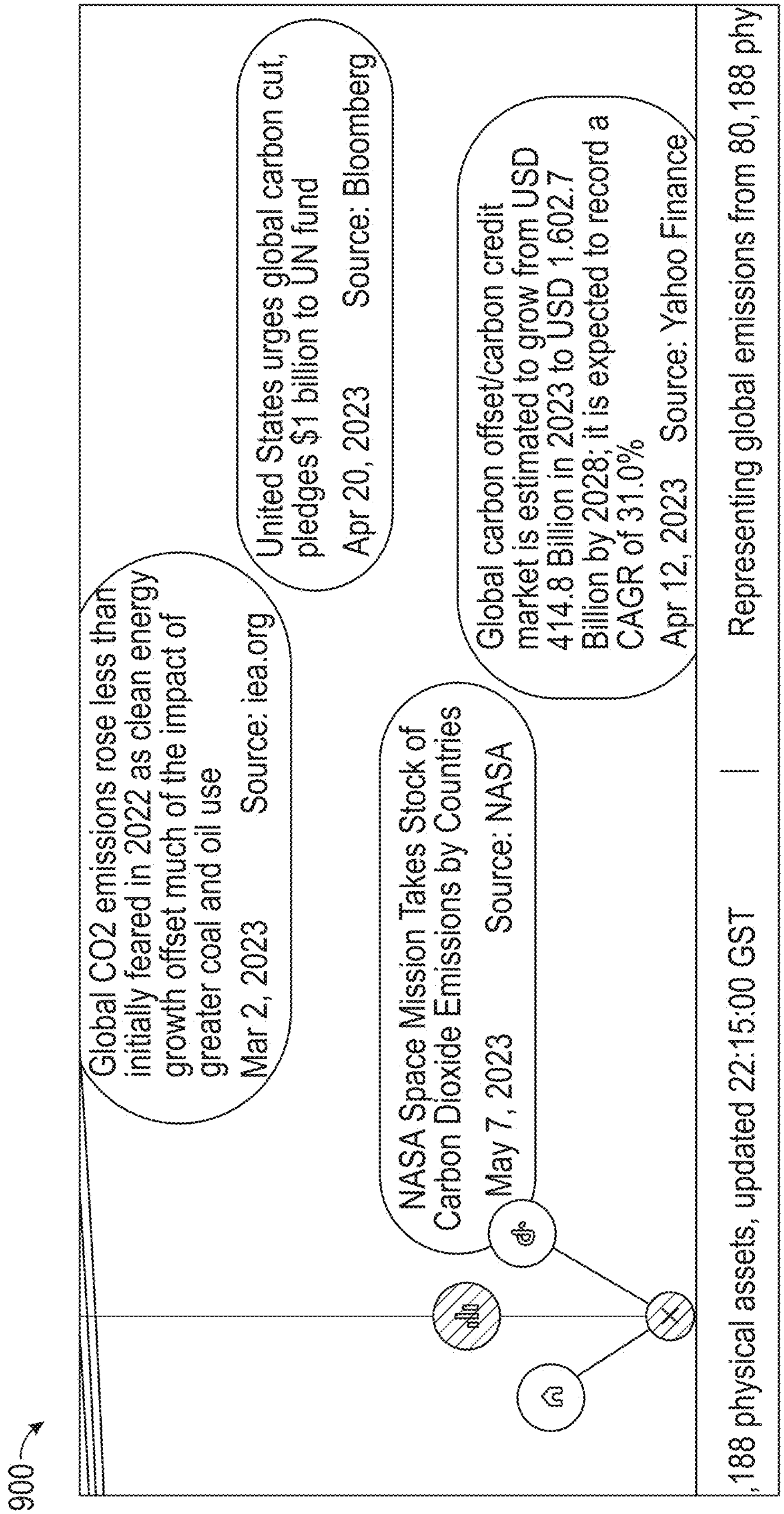
FIG. 9 is a user interface including a new feeds, according to an exemplary embodiment.

FIG. 9 depicts a user interface 900, according to some embodiments. In some embodiments, the user interface 900 can be included with and/or provided as a continuation of the user interface 800. For example, the user interface 900 can include the right portion of the user interface 800. The user interface 900 can include various news feeds. The news feeds may correspond to various elements that have been selected by the operator of the dashboard 605. For example, the operator may have selected an icon corresponding to water consumption and the user interface 900 may then display news feeds corresponding to water consumption. As another example, the operator may have selected an icon corresponding to carbon emissions at a given geographical region. The user interface may then display carbon emission information associated with the given geographical region.

Figure 10:
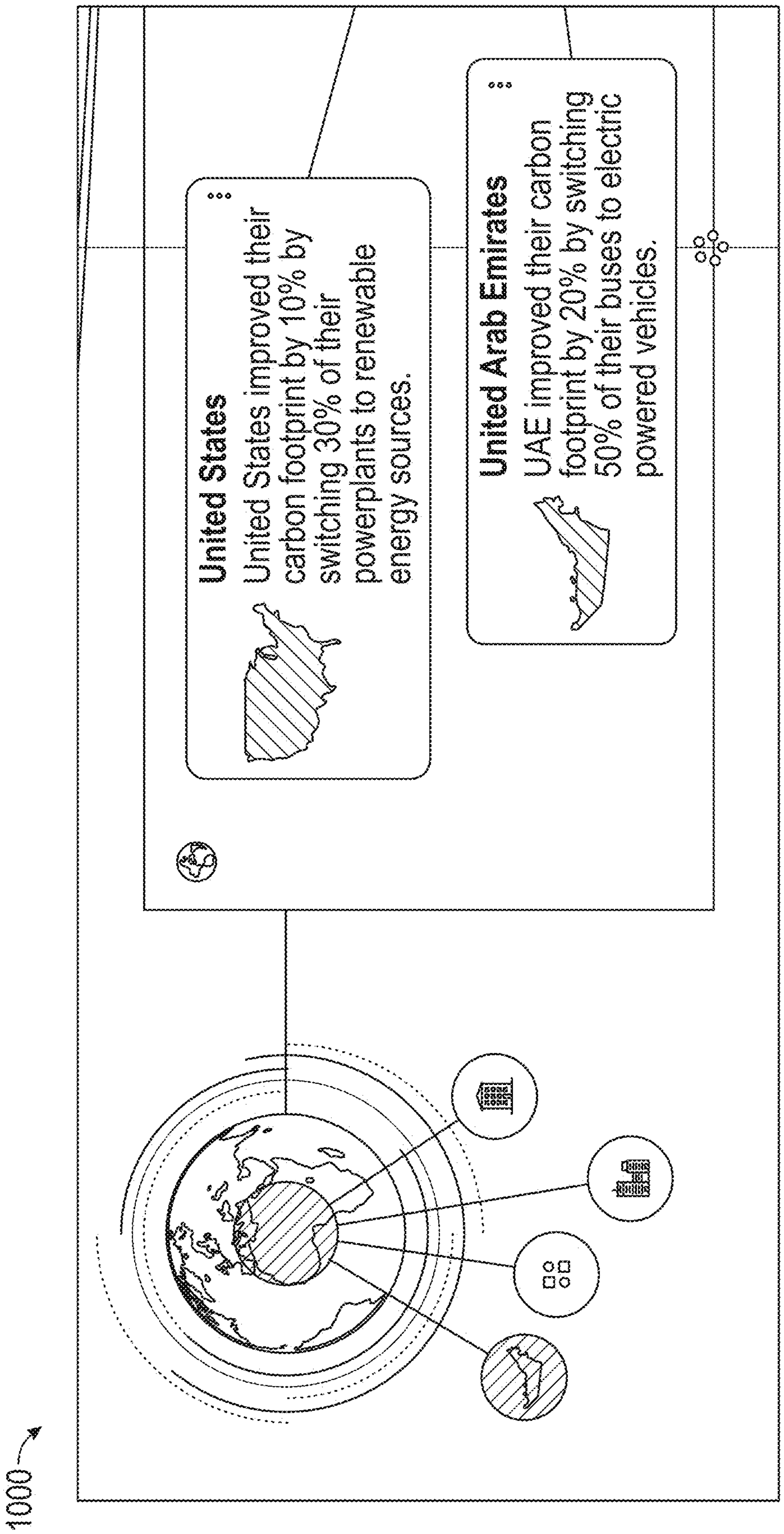
FIG. 10 is a user interface including selectable elements for use in adjusting emission information corresponding to a plurality of regions, according to an exemplary embodiment.

FIG. 10 depicts a user interface 1000, according to some embodiments. The user interface 1000 can be an adjusted and/or modified user interface. For example, the user interface 1000 can include the globe shown in FIG. 8. To continue this example, a size of the globe can be adjusted and/or changed and the globe can be used as a navigation tool (e.g., a user can select given portions of the globe to see emission information associated with various regions). The globe can also provide various emission views. For example, the globe can provide a country view, a state view, a district view, a region view, a city view, and/or a building view. Stated otherwise, the globe be presented and/or displayed such that the globe provides emission information associated with countries (e.g., country view), states (e.g., a state view), districts (e.g., a district view), regions (e.g., a region view), cities (e.g., a city view), and/or buildings (e.g., a building view).

Figure 11:
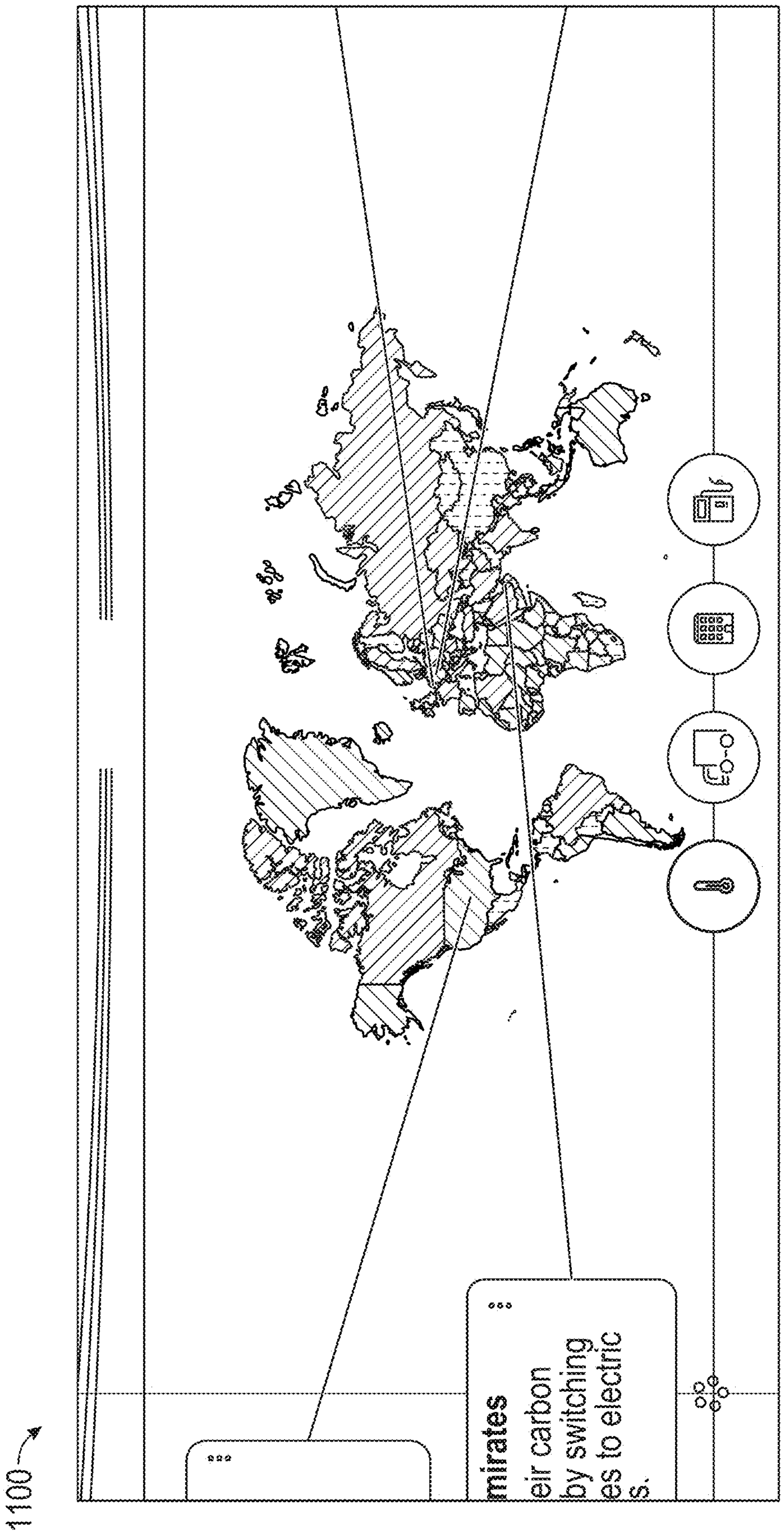
FIG. 11 is a user interface including a global view of emission information, according to an exemplary embodiment.

FIG. 11 depicts a user interface 1100, according to some embodiments. The user interface 1100 can be combined with and/or provided along with the user interface 1000. For example, the user interface 1000 may be presented as a left portion of the dashboard 605 and the user interface 1100 may be presented as a center portion of the dashboard 605. The user interface 1100 can include a heatmap view of various carbon dioxide emission activity across a flat world view. A user may interact with various countries included in the flat world view to see and/or otherwise be provided with an emission overview of the various countries. For example, selection of a country, via the user interface 1100, may cause the user interface to display and/or more present carbon dioxide information associated with the selected country.

Figure 12:
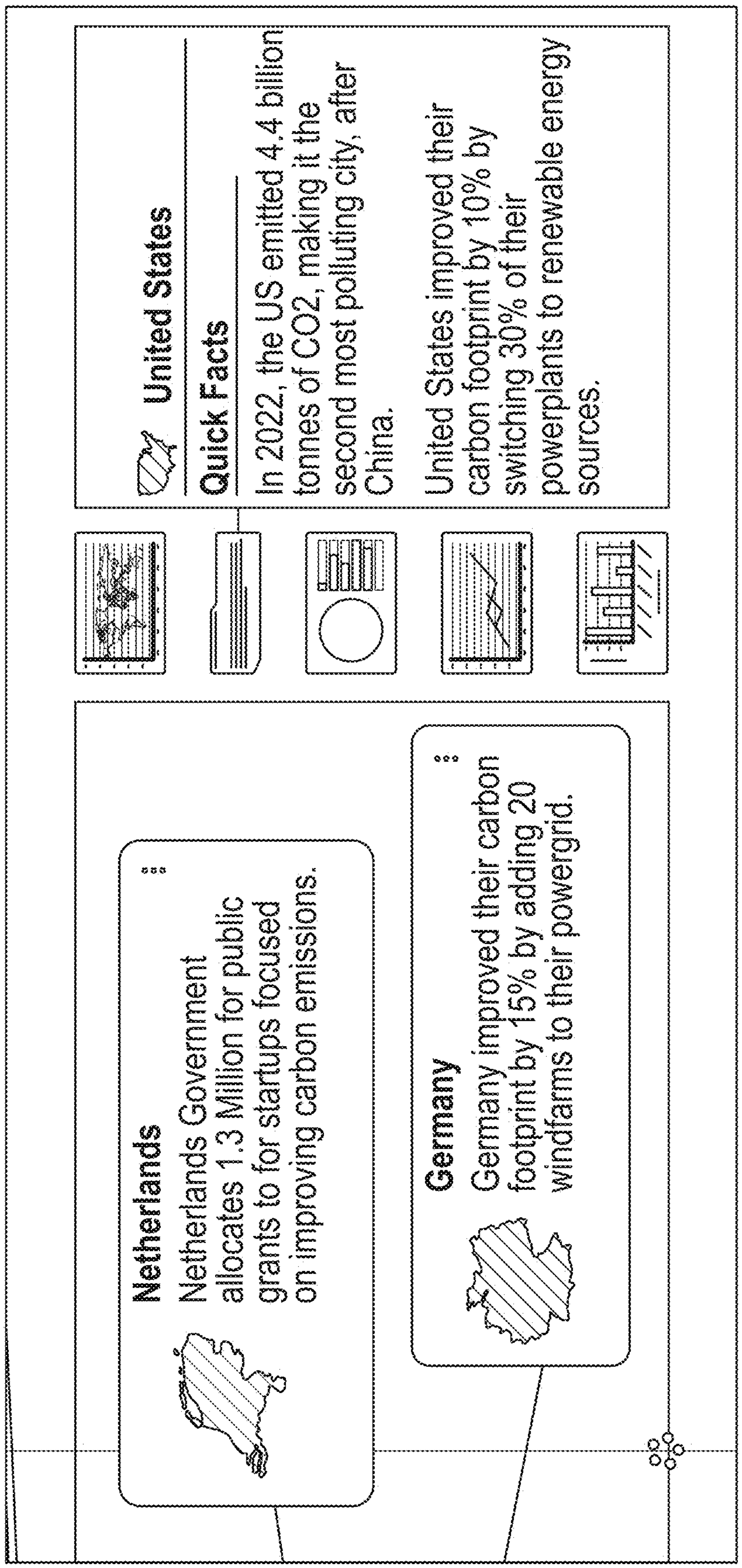
FIG. 12 is a user interface including emission information corresponding to a plurality of regions, according to an exemplary embodiment.

FIG. 12 depicts a user interface 1200, according to some embodiments. The user interface 1200 can be combined with and/or provided along with the user interface 1000 and the user interface 1100. For example, the user interface 1000 may be presented as a left portion of the dashboard 605, the user interface 1100 may be presented as a center portion of the dashboard 605, and the user interface 1200 may be presented as a right portion of the dashboard 605. The user interface 1200 can include a highlighted country level view. For example, the user interface 1200 can include emission statistics and/or emission trends corresponding to a selected country. As another example, the information presented via the user interface 1200 may correspond to a country selected via the user interface 1100.

Figure 13:
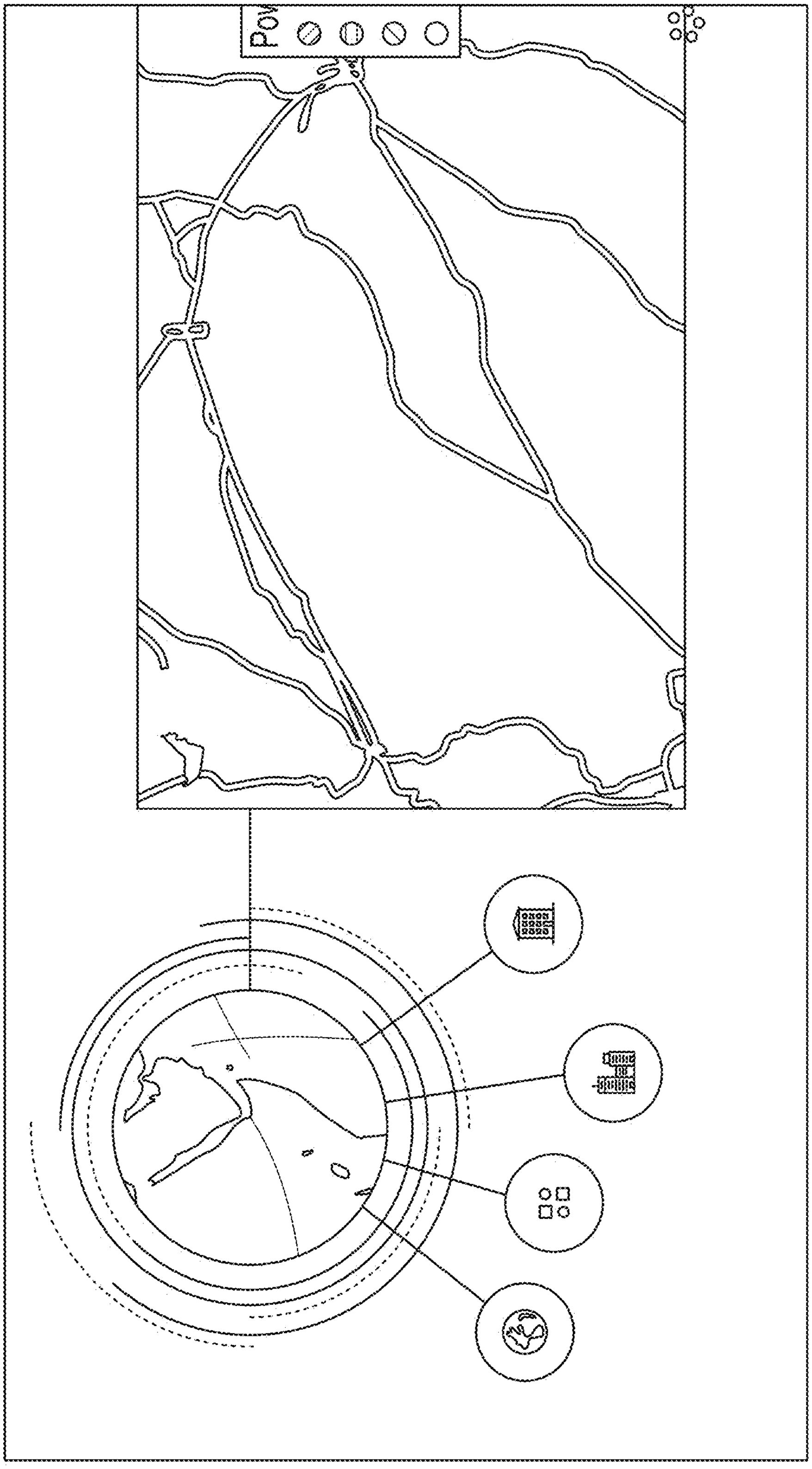
FIG. 13 is a user interface including selectable elements for use in adjusting emission information corresponding to a given region, according to an exemplary embodiment.

FIG. 13 depicts a user interface 1300, according to some embodiments. The user interface 1300 can be and/or include the user interface 1000. In some embodiments, the user interface 1300 can include information similar to that of the user interface 1000. In some embodiments, the user interface 1300 can provide similar functionality to that of the user interface 1000. The user interface 1300 can be provided and/or displayed responsive to an operator of the dashboard 605 selecting at least one of the various elements described herein. For example, the user interface 1300 may be displayed responsive to an operator selecting at least one element shown in the user interface 1100.

Figure 14:
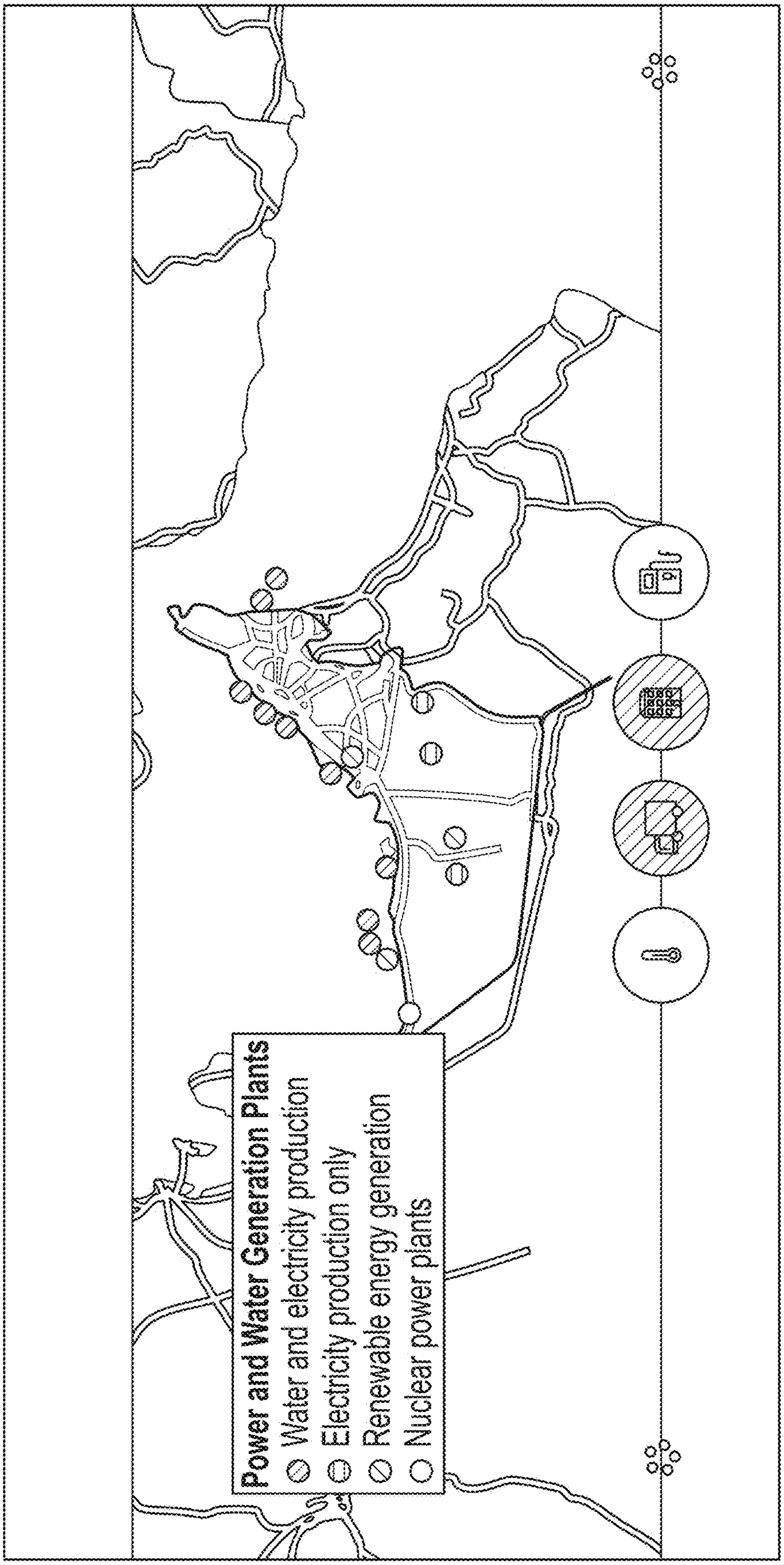
FIG. 14 is a user interface including a regional view of emission information, according to an exemplary embodiment.

FIG. 14 depicts a user interface 1400, according to some embodiments. The user interface 1400 can be combined with and/or provided along with the user interface 1300. For example, the user interface 1300 may be presented as a left portion of the dashboard 605 and the user interface 1400 may be presented as a center portion of the dashboard 605. The user interface 1400 can include a Birdseye view of a country. For example, the user interface 1400 can include a Birdseye view of a country selected in the user interface 1100. The user interface 1400 can include usage stats for various utility and/or emission categories. For example, the user interface 1400 can include water and electricity production information, renewable energy generation information, nuclear power plant information, and/or various combinations and/or alternatives. The user interface 1400 can include and/or provide access to various country specific views. For example, the user interface 1400 can include a heatmap view, a transportation view, a building view, and/or an industry view.

Figure 15:
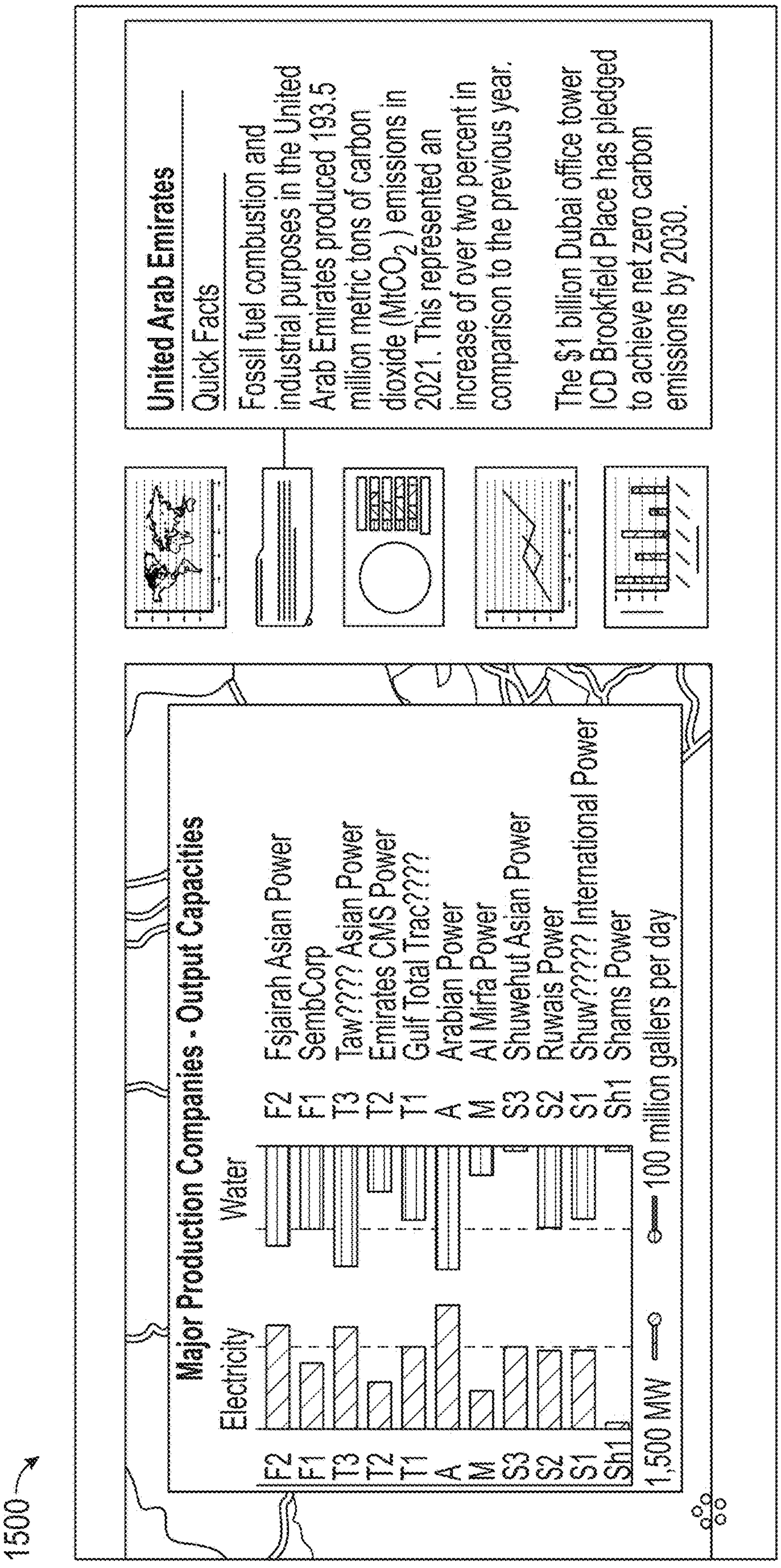
FIG. 15 is a user interface including emission information corresponding to a given region, according to an exemplary embodiment.

FIG. 15 depicts a user interface 1500, according to some embodiments. The user interface 1500 can be combined with and/or provided along with the user interface 1300 and the user interface 1400. For example, the user interface 1300 may be presented as a left portion of the dashboard 605, the user interface 1400 may be presented as a center portion of the dashboard 605, and the user interface 1500 may be presented as a right portion of the dashboard 605. The user interface 1500 can include a country module that displays various country specific information. For example, the user interface 1500 can include emission trends for various selected countries. As another example, the user interface 1500 may display and/or otherwise indicate one or more emission sources associated with the displayed emission information.

Figure 16:
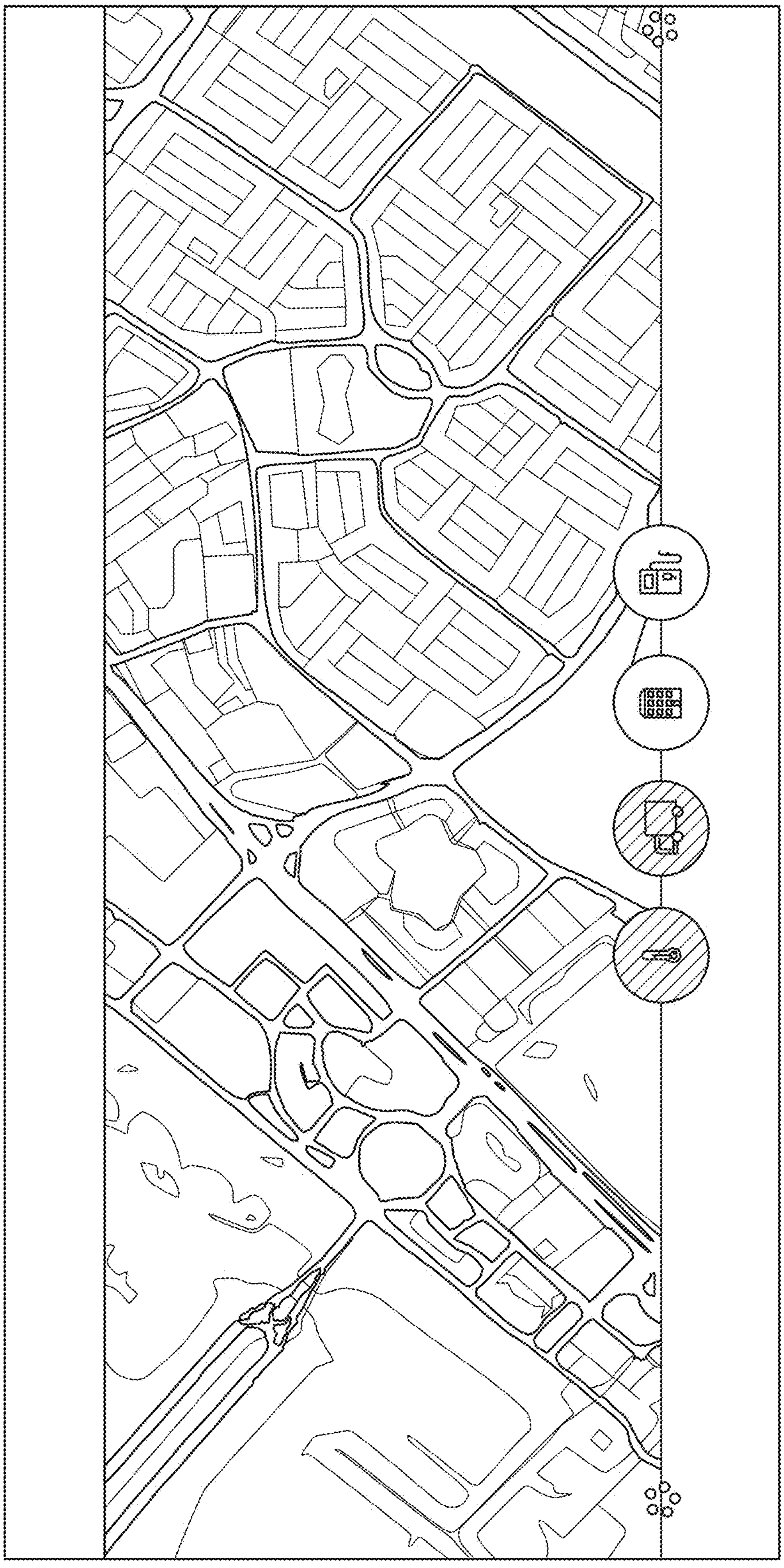
FIG. 16 is a user interface including a regional view of emission information, according to an exemplary embodiment.

FIG. 16 depicts a user interface 1600, according to some embodiments. The user interface 1600 can be and/or include a Birdseye view of a given city. For example, the operator of the dashboard 605 can select an icon associated with the given city and the user interface 1600 can be displayed responsive to selection of the icon. The user interface 1600 can include various information associated with the given city. For example, the user interface 1600 can include emission information associated with the given city, transportation information associated with the given city, and/or building specific information of the given city. The user interface 1600 can zoom in and/or out, move side to side, move up and down, and/or otherwise adjust to provide various views of given portions of the given city.

Figure 17:
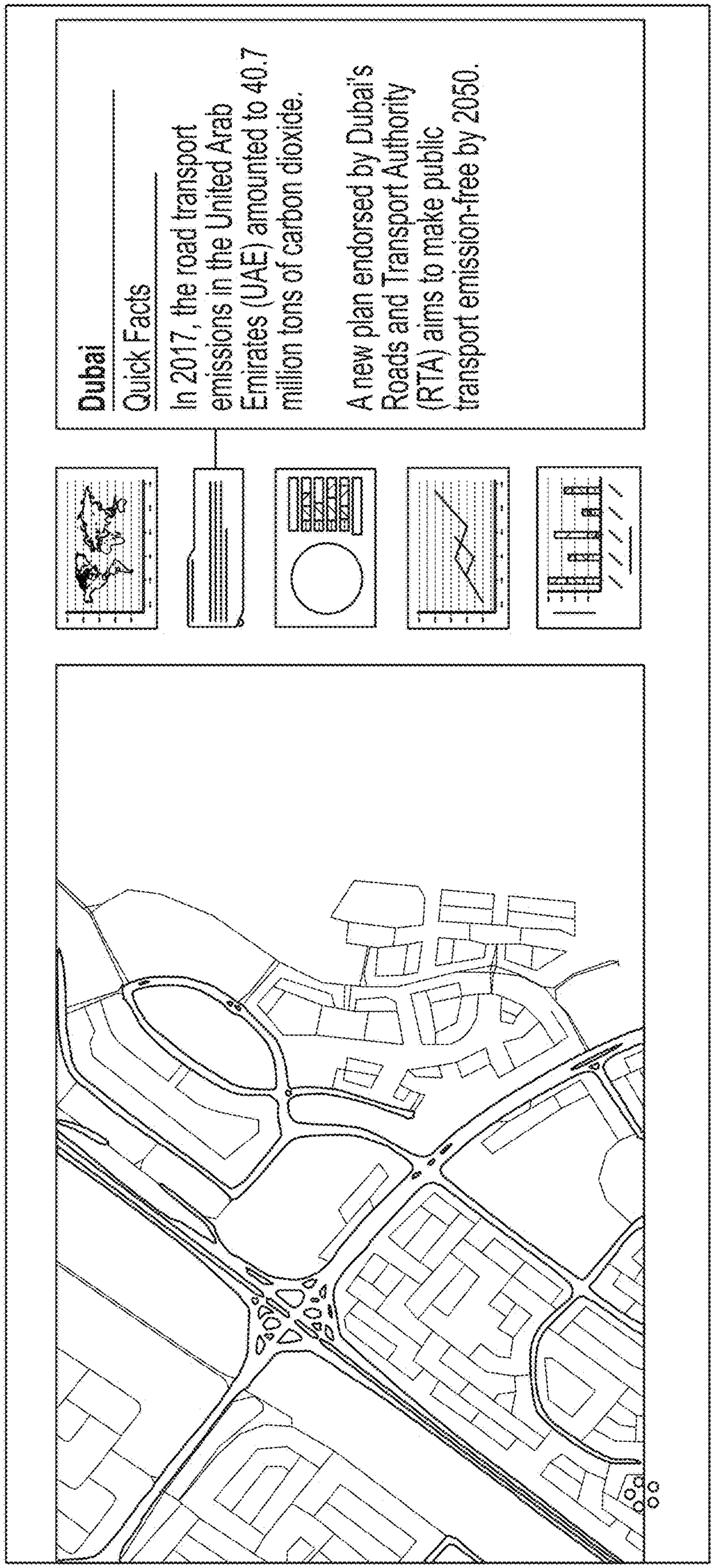
FIG. 17 is a user interface including emission information corresponding to a given region, according to an exemplary embodiment.

FIG. 17 depicts a user interface 1700, according to some embodiments. The user interface 1700 can be combined with and/or provided along with the user interface 1600. For example, the user interface 1600 may be presented as a left portion of the dashboard 605 and the user interface 1700 may be presented as a center portion of the dashboard 605. The user interface 1700 can include various transportation specific information corresponding to the given city of the user interface 1600. For example, the user interface 1700 can include travel patterns information and/or emission information pertaining to transportation.

Figure 18:
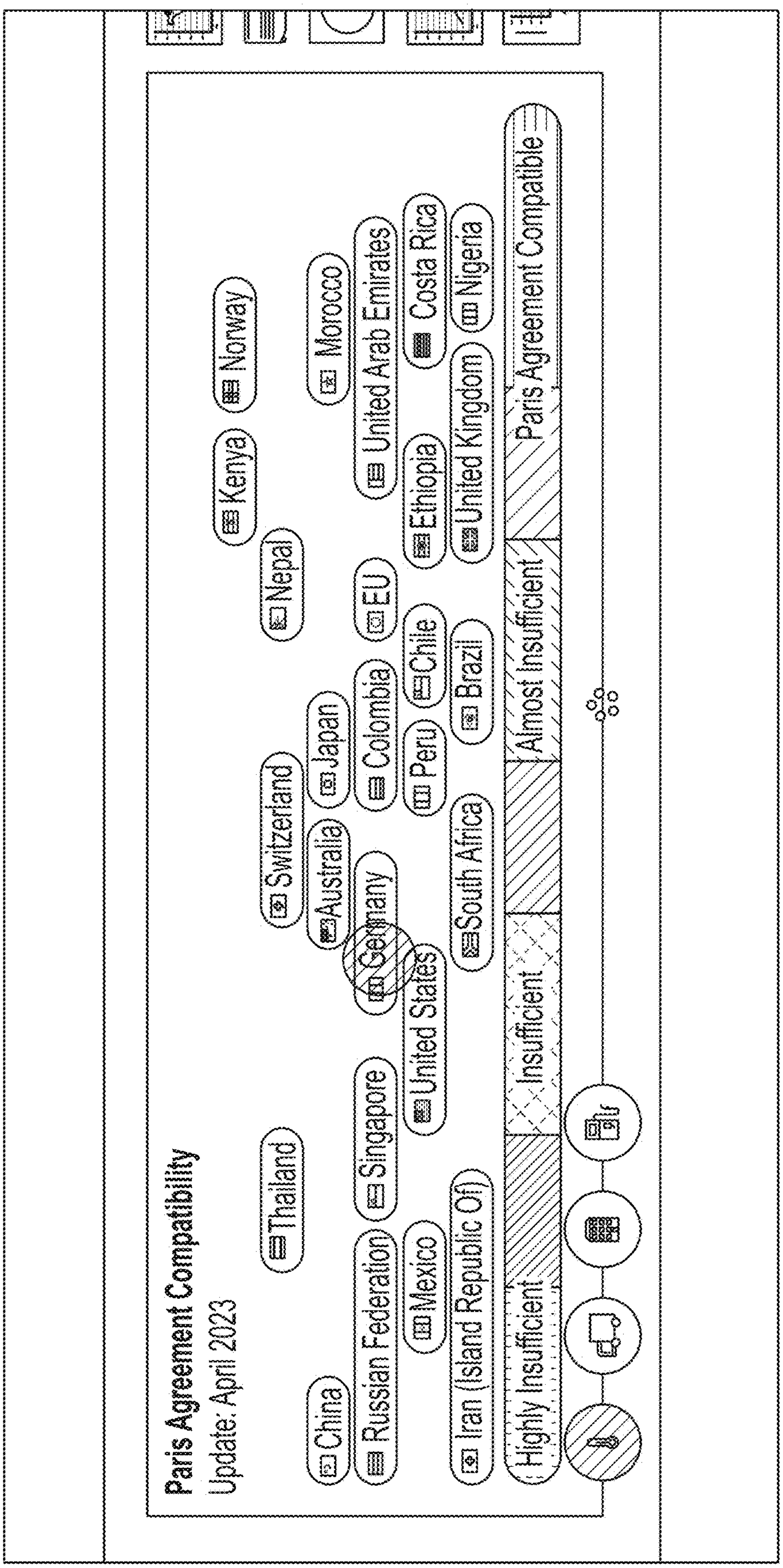
FIG. 18 is a user interface including a list indicating emission scores for a plurality of regions, according to an exemplary embodiment.

FIG. 18 depicts a user interface 1800, according to some embodiments. The user interface 1800 can be and/or include a leaderboard and/or a tier list. The user interface 1800 can include the list described herein. For example, the user interface 1800 can include the emission scores for the plurality of regional areas described herein. In some embodiments, the leaderboard shown in the user interface 1800 may be based on and/or correspond to a given criteria. For example, the leaderboard may be based on a governmental regulation standard.

Figure 19:
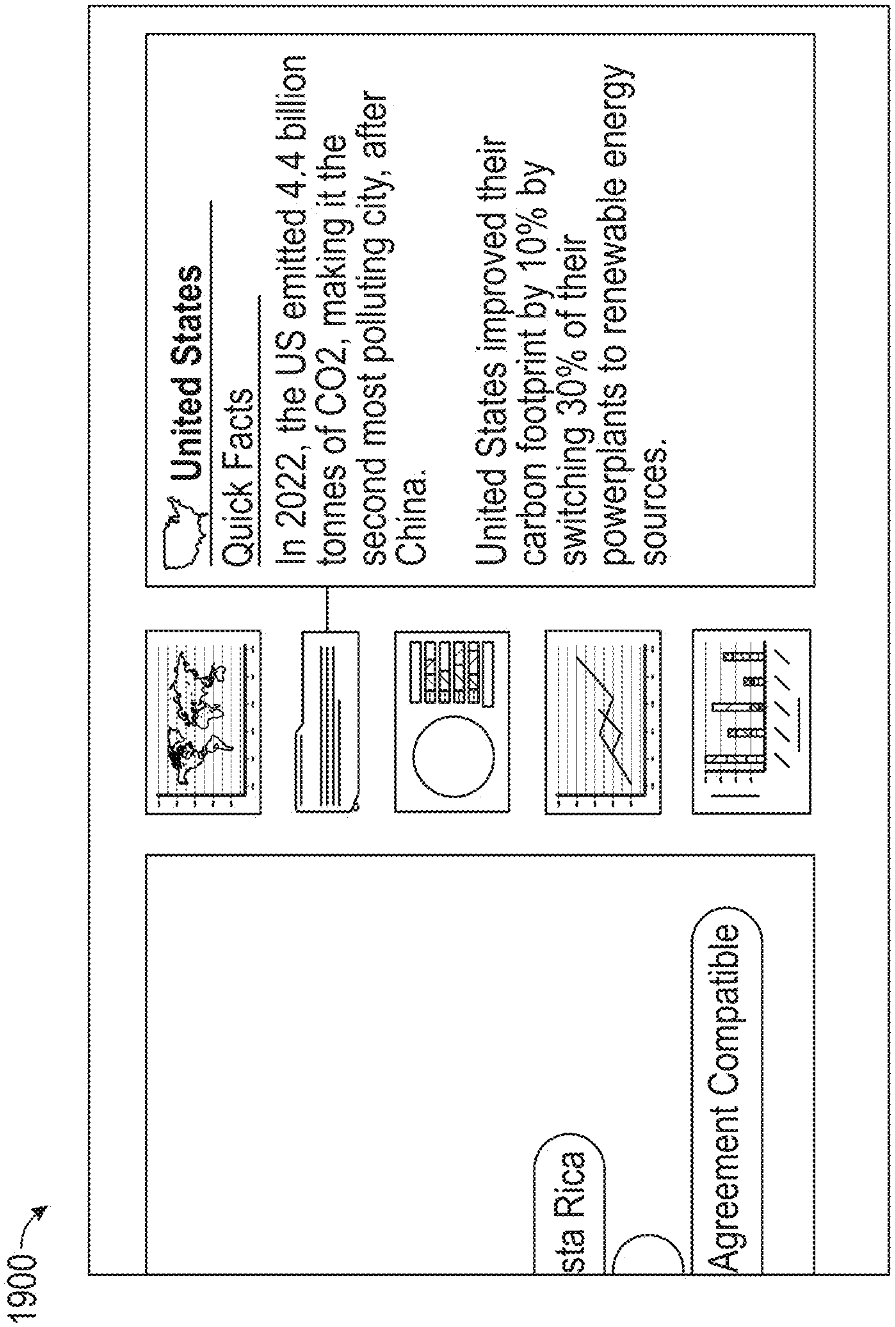
FIG. 19 is a user interface including emission corresponding to a list, according to an exemplary embodiment.

FIG. 19 depicts a user interface 1900, according to some embodiments. The user interface 1900 can be combined with and/or provided along with the user interface 1800. For example, the user interface 1800 may be presented as a left portion of the dashboard 605 and the user interface 1900 may be presented as a center portion of the dashboard 605. The information shown in the user interface 1900 may be updated, adjusted, and/or otherwise changed responsive to a user interacting with and/or interfacing with the various countries illustrated in the user interface 1800. For example, the user interface 1900 may display information pertaining to a first given country responsive to the user selecting the first given country and the user interface 1900 may be updated responsive to the user selecting a second given country.

Figure 20:
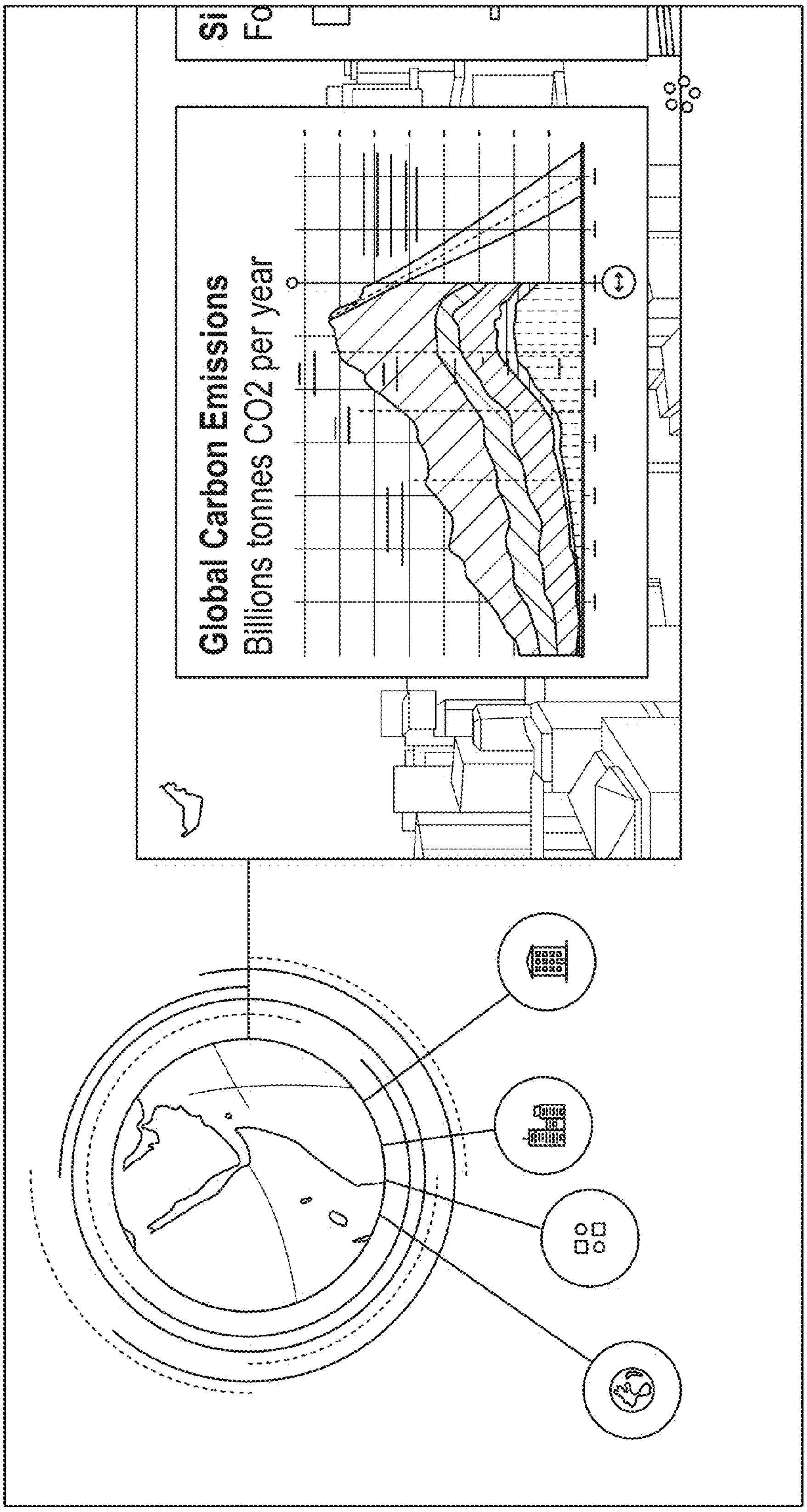
FIG. 20 is a user interface including a global view of emission information, according to an exemplary embodiment.

FIG. 20 depicts a user interface 2000, according to some embodiments. The user interface 2000 can include various emission information. For example, the user interface 2000 can include information corresponding to a global carbon emission value. The user interface 2000 can also include information and/or elements similar to at least one of the user interface 1000 and/or the user interface 1300.

Figure 21:
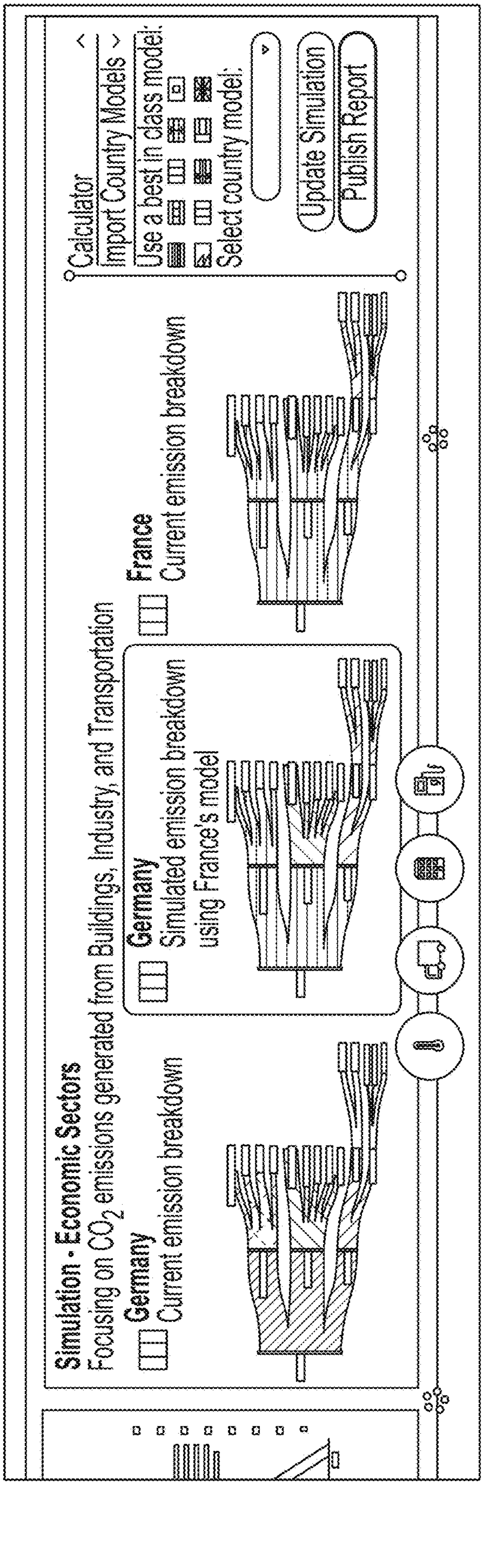
FIG. 21 is a user interface including emission breakdowns and emission predictions, according to an exemplary embodiment.

FIG. 21 depicts a user interface 2100, according to some embodiments. The user interface 2100 can be combined with and/or provided along with the user interface 2000. For example, the user interface 2000 may be presented as a left portion of the dashboard 605 and the user interface 2100 may be presented as a center portion of the dashboard 605. The user interface 2100 can include and/or provide various simulation experiences. For example, the user of the dashboard 605 can interface with and/or interact with the user interface 2100 to be provided with various simulated emission information. In some embodiments, the user interface 2100 can include three portions. The first portion can correspond to emission information of a first given country, the second portion can correspond to simulated emission information of the first given country, and the third portion can correspond to a second given country.

In some embodiments, the user can select the first given country and the second given country from the leaderboard shown in the user interface 1800. In some embodiments, the user interface 2100 can provide various models and/or emission standards implemented by the first given country and/or the second given country. The operator of the user interface 2100 can simulate various impacts on emission information for the first and/or second given country based on the various models and/or emission standards. For example, the operator can model an impact on emission scores for the first given country using emission standards for the second given country. The simulation may include and/or indicate and adjustment to the emission scores of the first given country responsive to using the emission standards of the second given country. The simulation experience provided in the user interface 2100 can also include simulation transportation information, building information, and/or industry information. The simulation experience may also be implemented at a state level, a district level, a region level, a city level, and/or a building level.

Figure 22:
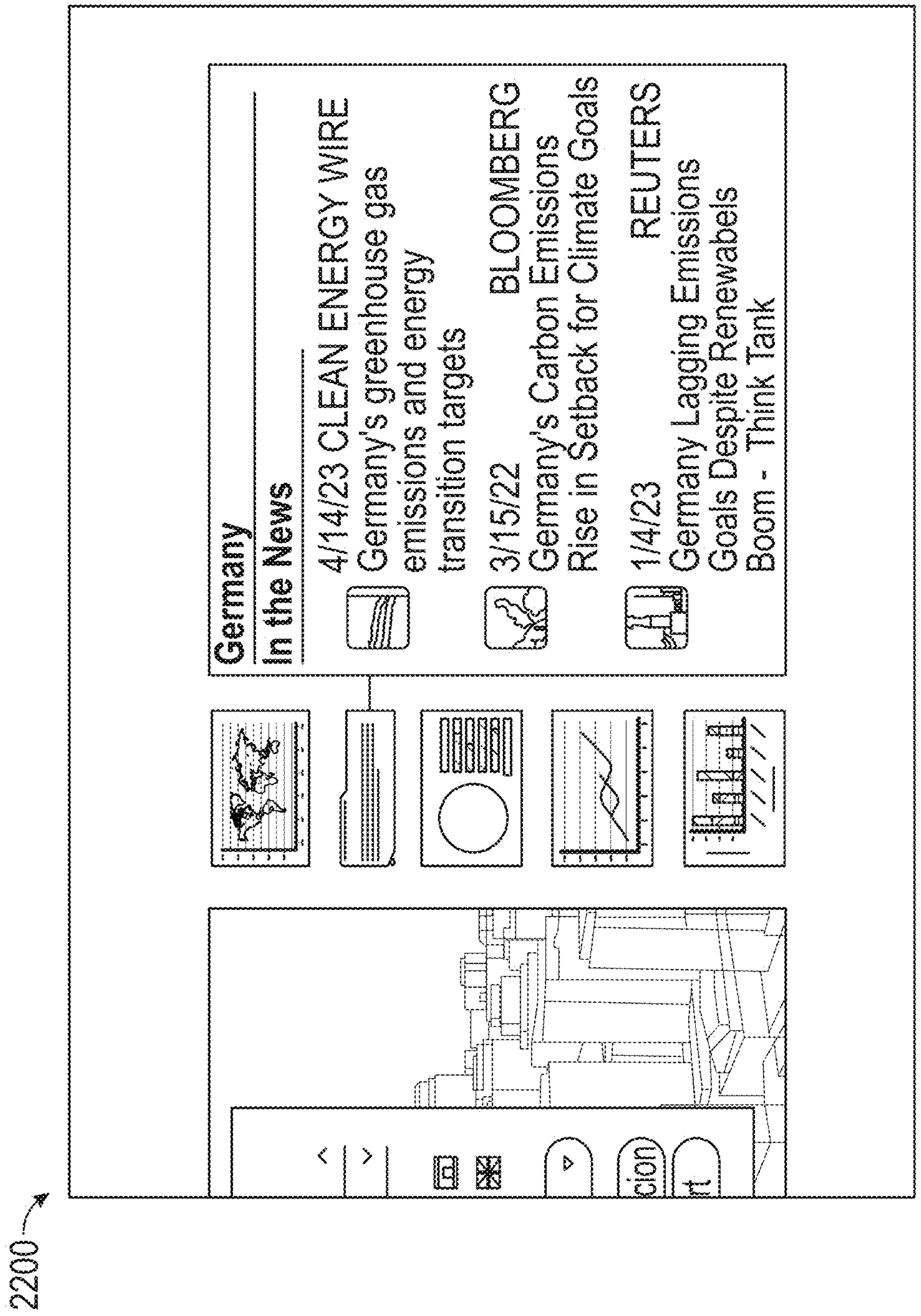
FIG. 22 is a user interface including a news feeds associated with a given region, according to an exemplary embodiment.

FIG. 22 depicts a user interface 2200, according to some embodiments. The user interface 2200 can be combined with and/or provided along with the user interface 2000 and the user interface 2100. For example, the user interface 2000 may be presented as a left portion of the dashboard 605, the user interface 2100 may be presented as a center portion of the dashboard 605, and the user interface 2200 may be presented as a right portion of the dashboard 605. The user interface 2200 can include emission information corresponding to at least one of the selected countries shown in the user interface 2100. The user interface 2200 can include information corresponding to at least one of a country, a state, a district, a region, a county, a city, a building, and/or various combinations.

Figure 23:
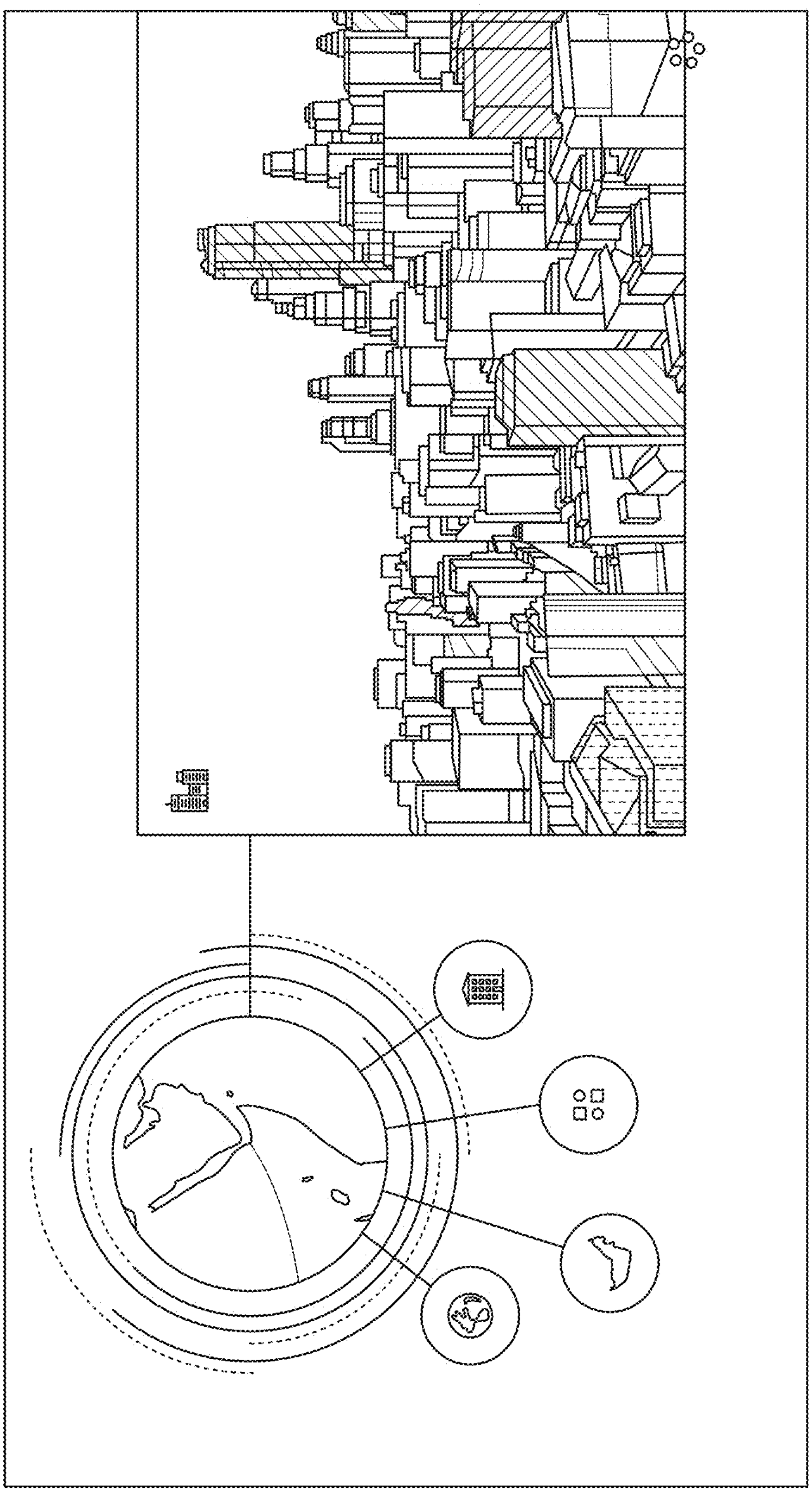
FIG. 23 is a user interface including a city view of emission information, according to an exemplary embodiment.

FIG. 23 depicts a user interface 2300, according to some embodiments. The user interface 2300 can be presented, provided, and/or displayed within and/or included in the dashboard 605. For example, the dashboard devices 560 can display the user interface 2300. The user interface 2300 can be displayed and/or provided across a given number of devices. For example, the user interface 2300 can be displayed across a first dashboard device 560 and a second dashboard device 560. The user interface 2300 can include at least one portion. For example, the user interface 2300 may include a left portion, a center portion, a right portion, and a bottom portion. In some embodiments, the user interface 2300 can include at least one moving sphere. The moving sphere can provide information pertaining to given carbon dioxide emission topics. For example, the moving sphere can include quick links to information pertaining to carbon dioxide information.

In some embodiments, the user interface 2300 can include a city view of emission information. In some embodiments, the city view may refer to and/or include at least one of a company view, a building view, an emission map, and/or various combinations thereof. For example, the city view may provide a graphical view of a city and the city view may highlight and/or color various buildings within the city to illustrates buildings associated with a given company. In some embodiments, the user interface 2300 can include graphical representations of one or more buildings. For example, FIG. 23 depicts an example of the user interface 2300 including graphics and/or images that represent and/or illustrate buildings. In some embodiments, the buildings and/or the graphical representation of the buildings may include various colors. For example, the buildings may be blude, green, yellow, and/or red. In some embodiments, a given color a building may illustrate and/or indicate a given emission value and/or a given emission impact. For example, a building that is show as red may indicate that the emission value for the building is greater than a predetermined threshold.

In some embodiments, the emission information can include information obtained and/or otherwise collected by the EMS 505. An operator and/or a user of the dashboard 605 can interact with the dashboard 605 to adjust, move, and/or otherwise change the city view. In some embodiments, the user interface 2300 can include selectable and/or clickable elements and the elements can correspond to various buildings located with the city. For example, the operator can select an element corresponding to a given building and/or type of building (e.g., manufacturing, commercial, mixed use, residential, healthcare, educational, etc.) to then see emission information pertaining to the selection.

In some embodiments, the colored buildings included in the user interface 2300 may correspond to and/or be associated with an entity. For example, the colored buildings included in the user interface 2300 may correspond to a property management company that owns and/or operates the colored buildings. As another example, the colored buildings may be associated with a given industry (e.g., manufacturing, residential, commercial, mixed used, healthcare, etc.).

Figure 24:
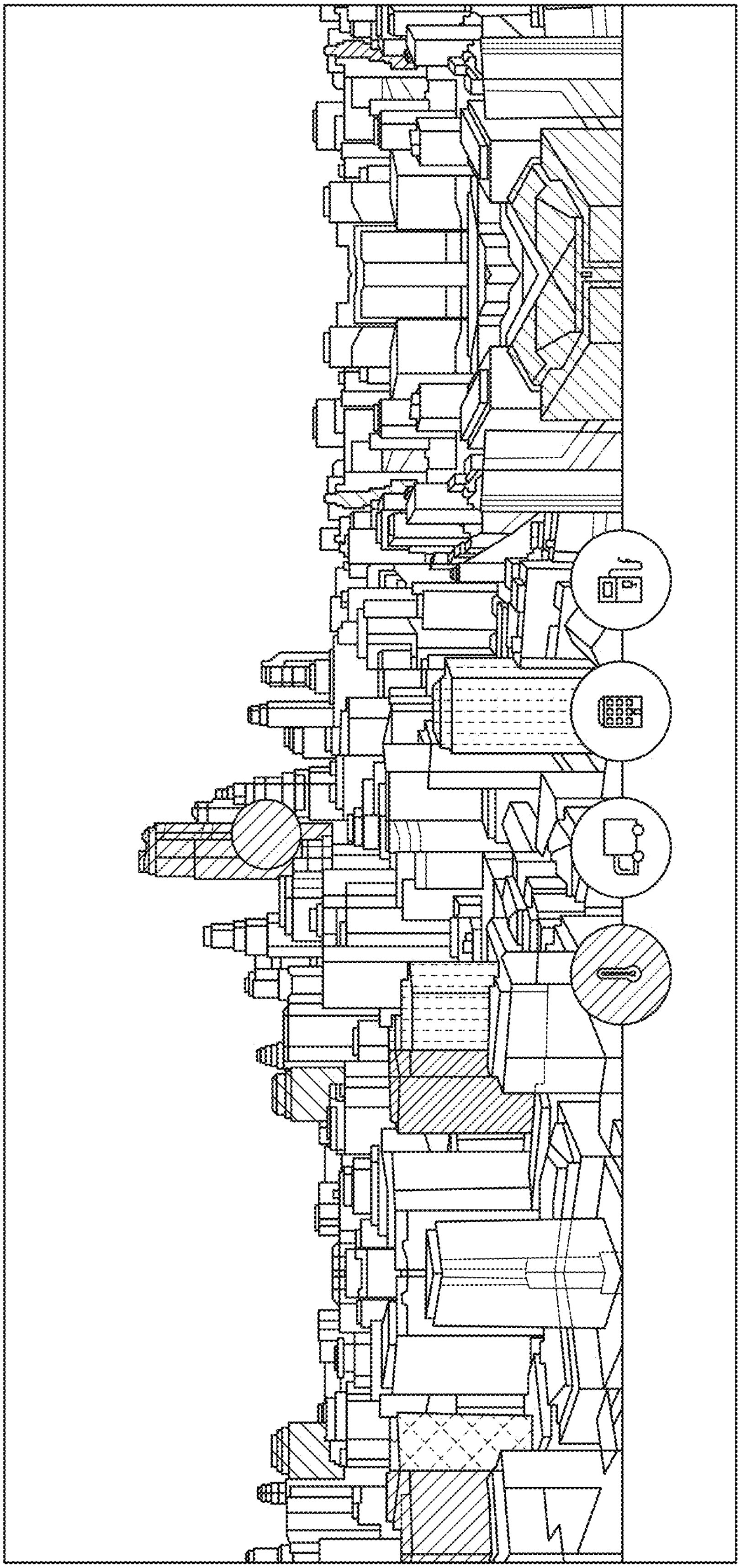
FIG. 24 is a user interface including a city view of emission information, according to an exemplary embodiment.

FIG. 24 depicts a user interface 2400, according to some embodiments. In some embodiments, the user interface 2400 may be included with and/or provided as a continuation of the user interface 2300. For example, the user interface 2300 may be displayed by a first dashboard device 560 and the user interface 2400 may be displayed by a second dashboard device 560. In some embodiments, the user interface 2400 may extend and/or expand the city view of the user interface 2300. For example, the user interface 2400 may include additional buildings that may not have been included in the user interface 2300. In some embodiments, the user interface 2300 may provide a city view of a first city and the user interface 2400 may provide a city view of a second city.

In some embodiments, the user interface 2400 can include at least one navigation and/or view element. For example, the user interface 2400 can include a selectable element that can change the city view to an industry view. FIG. 24 depicts an example of the user interface 2400 including four view elements (shown as a thermostat, a vehicle, a building, and a gas pump). In some embodiments, selection of the various view elements may modify and/or adjust the user interface 2400.

Figure 25:
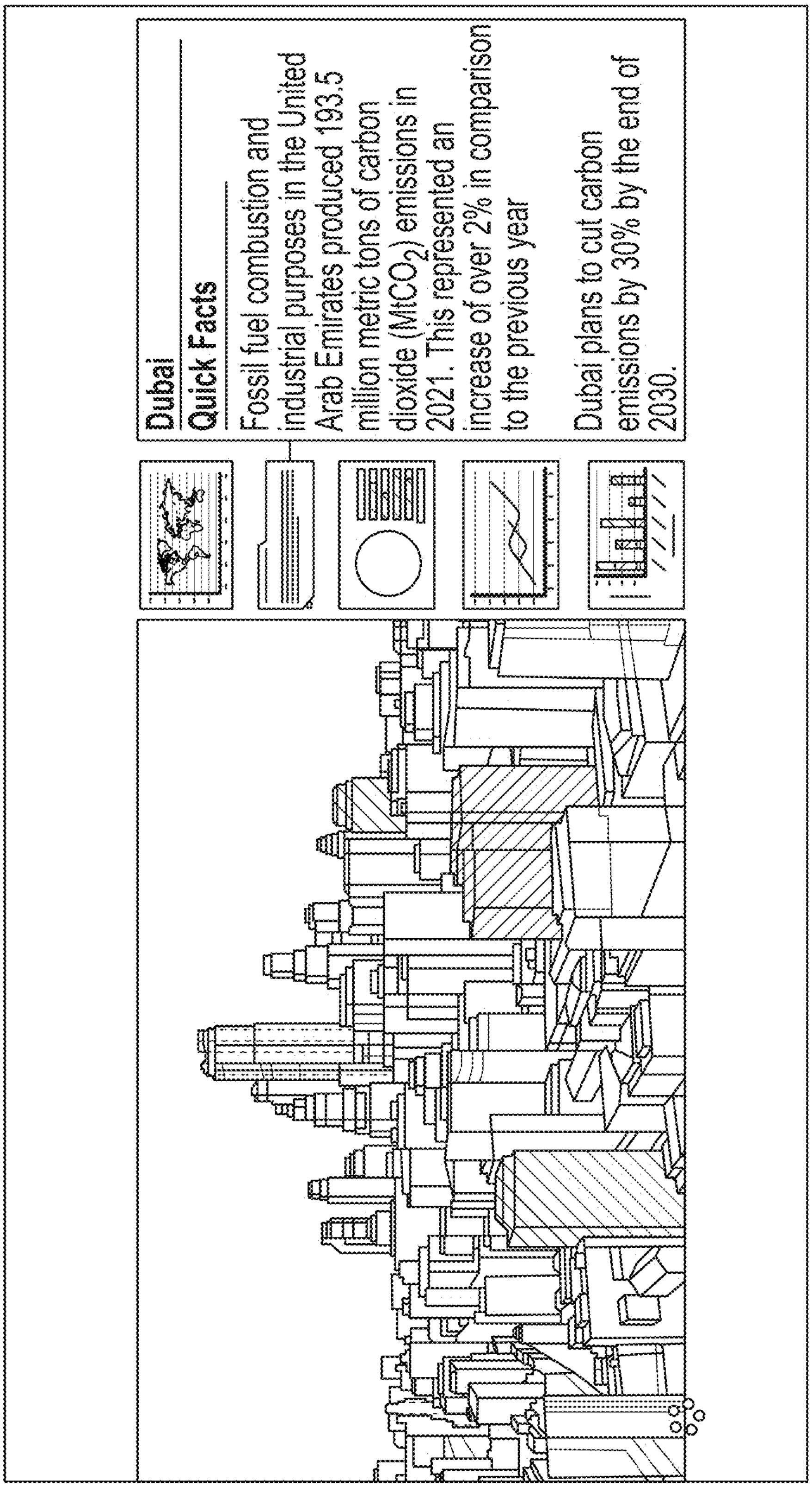
FIG. 25 is a user interface including a city view of emission information, according to an exemplary embodiment.

FIG. 25 depicts a user interface 2500, according to some embodiments. The user interface 2500 can be combined with and/or provided along with the user interface 2300 and the user interface 2400. For example, the user interface 2300 may be presented as a left portion of the dashboard 605, the user interface 2400 may be presented as a center portion of the dashboard 605, and the user interface 2500 may be presented as a right portion of the dashboard 605. The user interface 2500 can include a highlighted city view. For example, the user interface 2500 can include emission statistics and/or emission trends corresponding to a selected city.

In some embodiments, the user interface 2500 can include a news feed of various articles pertaining to emissions. For example, the user interface 2500 can include news articles pertaining to carbon emissions. In some embodiments, the user interface 2500 can include news feed pertaining to a city responsive to an operator selecting the given city for use in creating and/or providing a corresponding city view. In some embodiments, the user interface 2500 can include a universal news title ticker that provides real-time updates in a text format.

Figure 26:
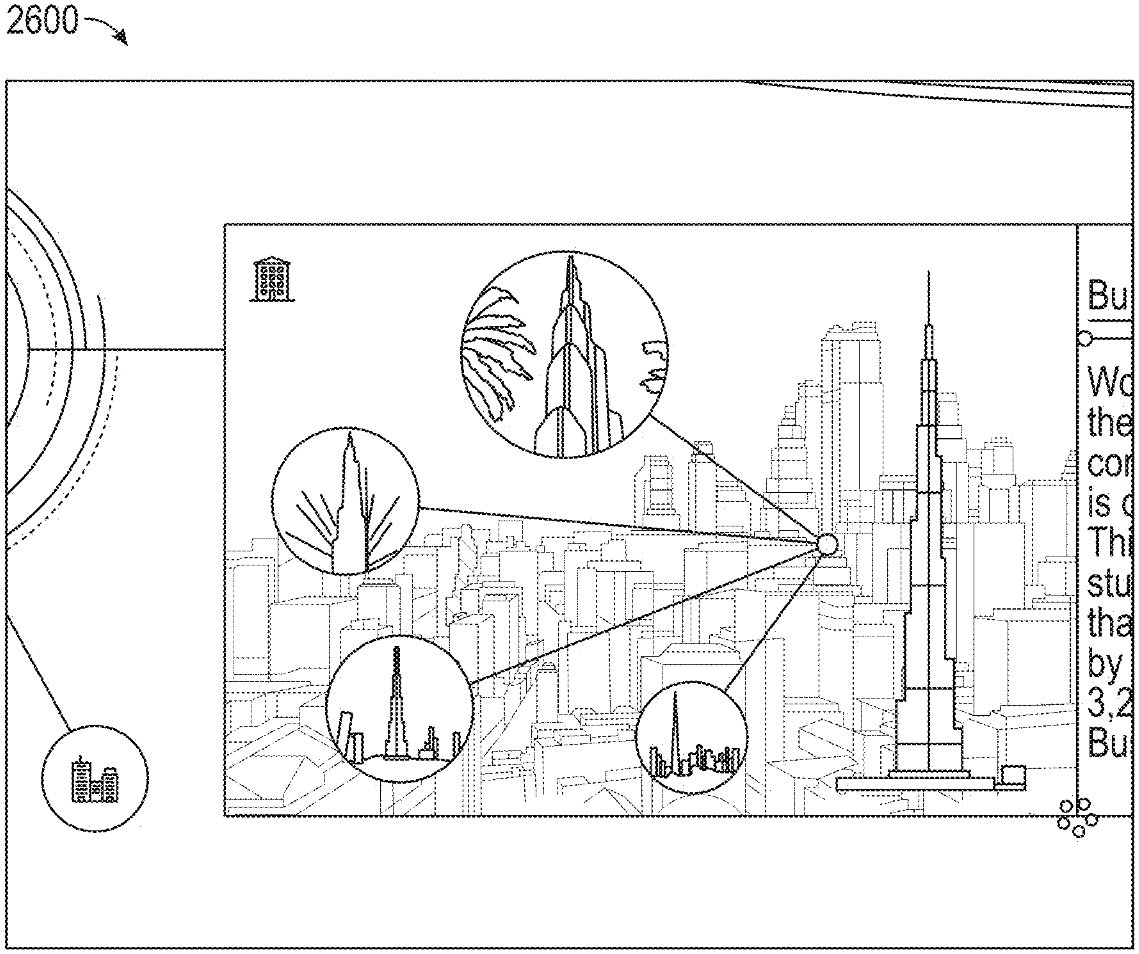
FIG. 26 is a user interface including a building view of emission information, according to an exemplary embodiment.

FIG. 26 depicts a user interface 2600, according to some embodiments. The user interface 2600 may be generated, displayed, and/or provided responsive selection of at least one of the buildings illustrated in and/or included in at least one of the user interface 2300, the user interface 2400, and/or the user interface 2500. In some embodiments, the user interface 2600 may refer to and/or include at least one of a building view, a company view, and/or a spotlight view. In some embodiments, the user interface 2600 may include a graphical representation of the building. For example, the user interface 2600 may include an image and/or a display of the building. In some embodiments, the user interface 2600 may include a plurality of images with respect to the building.

Figure 27:
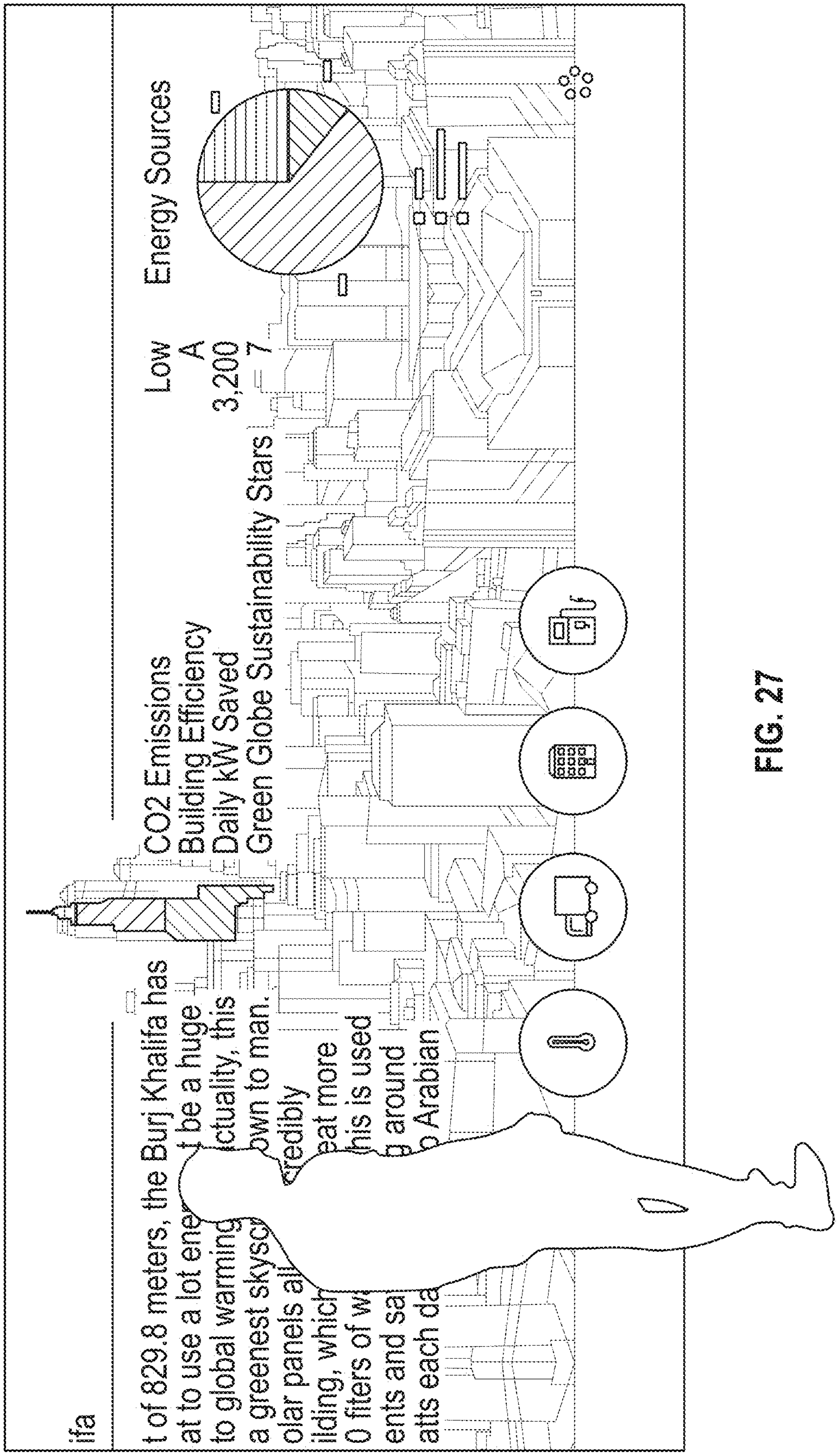
FIG. 27 is a user interface including a building view of emission information, according to an exemplary embodiment.

FIG. 27 depicts a user interface 2700, according to some embodiments. The user interface 2700 may be combined with and/or provided along with the user interface 2600. For example, the user interface 2600 may be provided as a first portion of the dashboard 605 and the user interface 2700 may be provided as a second portion of the dashboard 605.

In some embodiments, the user interface 2700 can may include building specific information. For example, the user interface 2700 may include emission information that corresponds to the building included in the user interface 2600. In some embodiments, the user interface 2700 may include stats for various utility and/or emission categories. For example, the user interface 2700 can include water and electricity production information, renewable energy generation information, nuclear power plant information, and/or various combinations and/or alternatives.

In some embodiments, the user interface 2700 may include the list described herein. For example, the user interface 2700 may indicate a given rank and/or metric for the building. As shown in FIG. 27, the CO2 emissions for the building are shown as “Low.” In some embodiments, the CO2 emissions for the building may be relative to one or more buildings included in a city and/or the CO2 emissions for the building may be an absolute scale. In some embodiments, the user interface 2700 may include an energy source breakdown chart. For example, the user interface 2700 may identify and/or breakdown energy consumption for the building by energy source.

Figure 28:
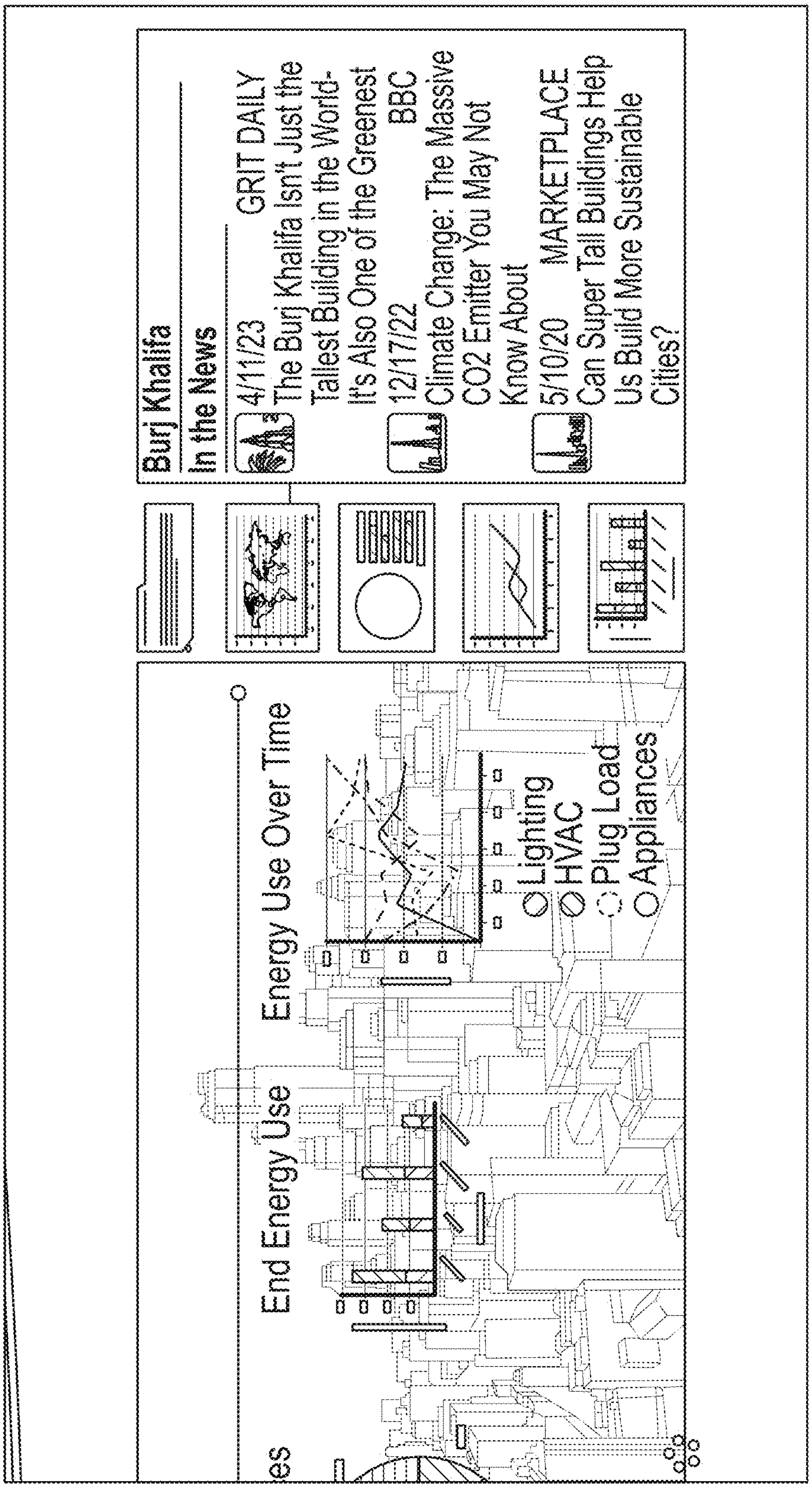
FIG. 28 is a user interface including a building view of emission information, according to an exemplary embodiment.

FIG. 28 depicts a user interface 2800, according to some embodiments. The user interface 2800 can be combined with and/or provided along with the user interface 2700 and the user interface 2600. For example, the user interface 2600 may be presented as a left portion of the dashboard 605, the user interface 2700 may be presented as a center portion of the dashboard 605, and the user interface 2800 may be presented as a right portion of the dashboard 605. The user interface 2800 can include emission information corresponding to the selected building (e.g., the building illustrated in the user interface 2600). In some embodiments, the user interface 2800 can include information corresponding to at least one of a country, a state, a district, a region, a county, a city, a building, and/or various combinations. For example, the user interface 2800 may include a news feed and/or a news scroll that corresponds to a city that includes the building.

Figure 29:
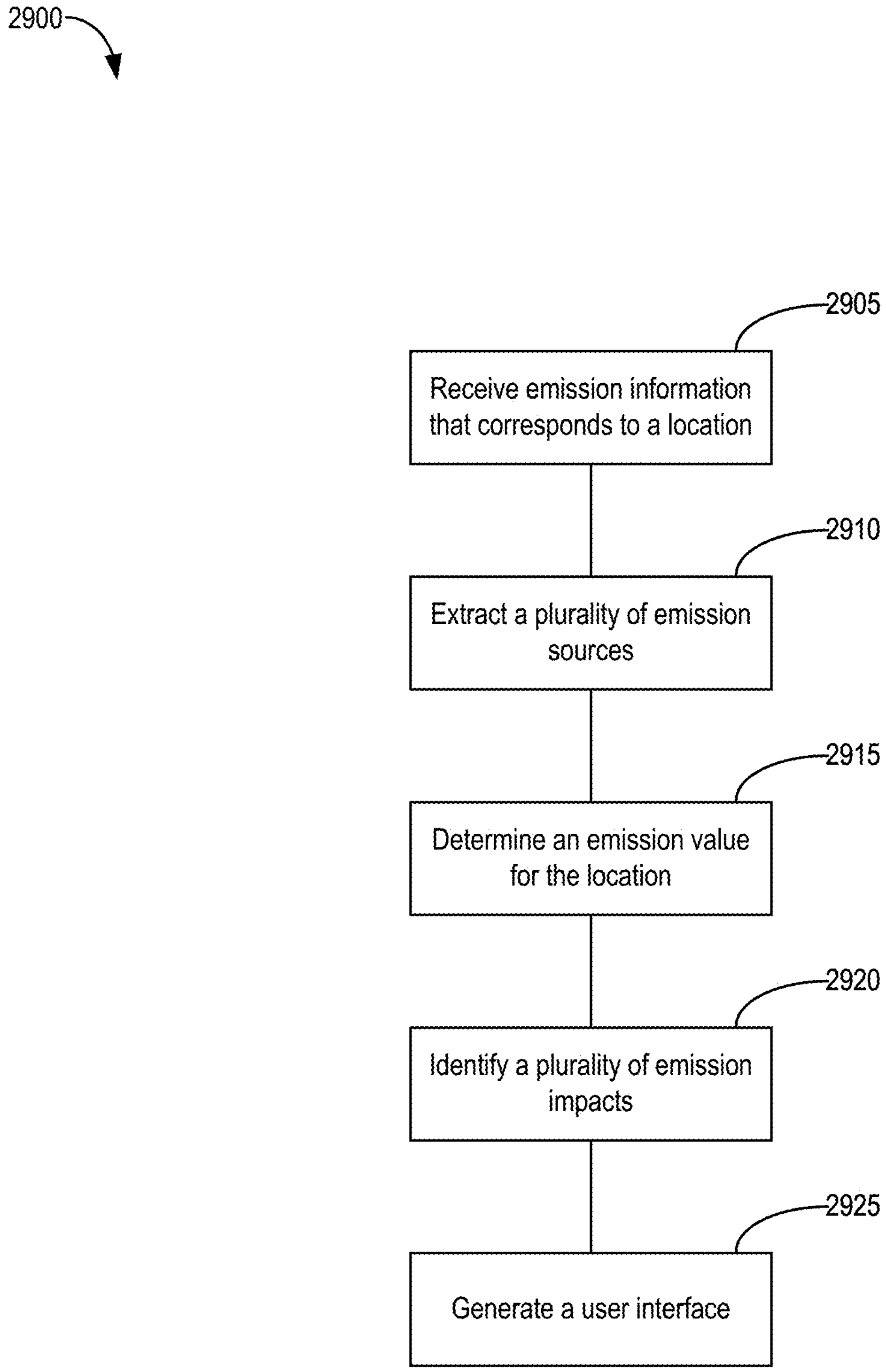
FIG. 29 is a flow diagram of a process to generate emission values for a regional area, according to an exemplary embodiment.

FIG. 29 depicts a flow diagram of a process 2900 to generate emission values for a regional area, according to some embodiments. At least one of the various systems, devices, and/or components described herein may perform the process 2900 and/or one or more steps thereof. For example, the EMS 505 may perform at least one step of the process 2900. In some embodiments, the process 2900 and/or one or more steps may be adjusted and/or changed such that one or more steps of the process 2900 may be added, separated, deleted, removed, omitted, skip, repeated, replicated, reproduced, and/or otherwise modified. For example, a given step of the process 2900 may be separated into a first step and a second step. As another example, two steps, described as being separate, of the process 2900 may be combined into a single step.

In some embodiments, at step 2905, emission information that corresponds to a location may be received. For example, emission information that corresponds to a geographical location (e.g., city, state, region, country, etc.) may be received. As another example, the EMS 505 may receive emission information from the data sources 555. In some embodiments, the emission information may include information such as, carbon emission, carbon production, energy consumption, renewable energy generation, renewable energy consumption, water consumption, and/or waste generation. For example, the EMS 505 may receive, from the data sources 555, emission information that indicates a total amount of carbon production in a region (e.g., a location). In some embodiments, the emission information may be generated by and/or based on information provided by one or more utility entities (e.g., gas distributors, electric grid measurements, sewage and water sources, etc.)

In some embodiments, at step 2910, a plurality of emission sources may be extracted. For example, the EMS 505 may extract one or more sources from the emission information received in step 2905. Stated otherwise, the EMS 505 may detect and/or identify information, included in the emission information, which indicates one or more sources that contributed to the emissions indicated in the emission information. For example, the EMS 505 may detect one or more buildings that emit carbon as a result of operating the building in the location. As another example, the EMS 505 may detect one or more sites, within the location, the produce renewable energy.

In some embodiments, at step 2915, an emission value for the location may be determined. For example, the EMS 505 may generate a score and/or metric (e.g., a value) that represents a total amount of emission contributed to the location. As another example, the EMS 505 may aggregate and/or otherwise combine emission metrics, from the emission information, to determine the emission value. In some embodiments, the emission value may be a percentile and/or other possible ranking. For example, the emission value may indicate a peer ranking of the location relative to one or more second locations.

In some embodiments, at step 2920, a plurality of emission impacts may be identified. For example, the EMS 505 may identify at least one of building, entities, equipment, sources, and/or other factors that contribute to the emissions associated with the location. As another example, the EMS 505 may identify transportation mechanism (e.g., public transit, vehicle transportation, aerial transportation, etc.) associated with the location. In some embodiments, the emission impacts may refer to and/or represent a percent contribution and/or a weighted value that represents a contribution, of a given entity, towards the overall emissions for the location. For example, the emission impact for a given building may represent how much carbon emission, for the location, is attributed to operation of the given building.

In some embodiments, at step 2925, a user interface may be generated. For example, the user interface may be generated and displayed via the dashboard 605. As another example, the user interface may be generated via a mobile application stored on the user device 550. In some embodiments, the user interface may include and/or indicate one or more sets of information. For example, the user interface may include one or more graphical representations (e.g., display elements, icon, images, image frames, videos, etc.) that indicate at least one of the emission value identified in step 2915, the emission impacts identified in 2920, and/or one or more actions to adjust the emission value and/or at least one emission impact. In some embodiments, the EMS 505 may generate the actions responsive to execution of one or more models. For example, the EMS 505 may provide emission information, to a generative artificial intelligence model, to cause the generative artificial intelligence model to generate one or more outputs that indicate actions to implement.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising one or more memory devices storing instructions thereon that, when executed by one or more processors, cause the one or more processors to:
- receive, from a plurality of data sources, emission information corresponding to a location;
- extract, from the emission information, a plurality of emission sources associated with the location, the plurality of emission sources including one or more entities whose operation contributes to emissions at the location;
- determine, based on information associated with the plurality of emission sources, an emission value for the location based on a combination of the emissions at the location;
- identify, based on the emission value, a plurality of emission impacts for the plurality of emission sources that resulted in the location having the emission value, wherein a respective emission impact of the plurality of emission impacts indicates a respective contribution, by a corresponding emission source of the plurality of emission sources, to the emission value;
- generate, responsive to identification of the plurality of emission impacts, a user interface for display via a display device, the user interface to indicate:
  - the plurality of emission sources;
  - the plurality of emission impacts; and
  - a plurality of actions to adjust the emission value or at least one emission impact of the plurality of emission impacts; and
- execute, responsive to receipt of a selection of at least one action of the plurality of actions, the at least one action which includes initiation of automated control of one or more pieces of building equipment.

2. The system of claim 1, wherein the instructions further cause the one or more processors to:
- monitor, responsive to execution of the at least one action of the plurality of actions, the emission value;
- detect, based on subsequent emission information, a change in the emission value; and
- update, responsive to detection of the change in the emission value, the user interface to reflect the change in the emission value.

3. The system of claim 1, wherein the instructions further cause the one or more processors to:
- cause, responsive to selection of the at least one action, a machine learning model to generate an output to indicate a change in the emission value resulting from implementation of the at least one action; and
- update, responsive generation of the output, the user interface to display the change in the emission value.

4. The system of claim 1, wherein the instructions further cause the one or more processors to:

determine, responsive to execution of the at least one action of the plurality of actions, a change in the emission value; and update, based on the change in the emission value, a machine learning model, wherein the machine learning model is configured to identify correlations between emission values for a plurality of locations and one or more actions to adjust the emission values.

5. The system of claim 1, wherein the instructions further cause the one or more processors to:

receive, from the plurality of data sources, subsequent emission information pertaining to a plurality of locations;

determine, based on the subsequent emission information, a plurality of emission values;

generate, based on the emission value and the plurality of emission values, a list including a plurality of tiers, wherein a first tier of the plurality of tiers is associated with a first emission value of the plurality of emission values; and update, responsive to generation of the list, the user interface to include the list, wherein inclusion of a first location of the plurality of locations within the first tier provides an indication that the first location includes the first emission value.

6. The system of claim 1, wherein the plurality of data sources include at least one of:

open-source emission information corresponding to the location; or information associated with operation of the one or more pieces of building equipment within the location.

7. The system of claim 1, wherein the instructions cause the one or more processors to:

transmit one or more application programming interface calls to a remote device associated with the plurality of data sources; and receive, responsive to transmission of the one or more application programming interface calls, the emission information.

8. The system of claim 1, wherein the instructions cause the one or more processors to:

provide, as one or more inputs to a machine learning model, the plurality of emission sources and the emission value, wherein the machine learning model is trained to identify correlations between previously implemented actions and corresponding changes to emission values; and cause the machine learning model to generate the plurality of actions based on a correlation between the emission value and the plurality of actions.

9. The system of claim 1, wherein the emission information includes at least one of:

an indication of carbon emission within the location;

an indication of greenhouse gas emission within the location;

an indication of energy consumption within the location; or an indication of water consumption within the location.

10. A method, comprising:

receiving, by one or more processing circuits, from a plurality of data sources, emission information corresponding to a location;

extracting, by the one or more processing circuits, from the emission information, a plurality of emission sources associated with the location, the plurality of emission sources including one or more entities whose operation contributes to emissions at the location;

determining, by the one or more processing circuits, based on information associated with the plurality of emission sources, an emission value for the location based on a combination of the emissions at the location;

identifying, by the one or more processing circuits, based on the emission value, a plurality of emission impacts for the plurality of emission sources that resulted in the location having the emission value, wherein a respective emission impact of the plurality of emission impacts indicates a respective contribution, by a corresponding emission source of the plurality of emission sources, to the emission value;

generating, by the one or more processing circuits, responsive to identification of the plurality of emission impacts, a user interface for display via a display device, the user interface to indicate:

the plurality of emission sources;

the plurality of emission impacts; and a plurality of actions to adjust the emission value or at least one emission impact of the plurality of emission impacts; and executing, by the one or more processing circuits, responsive to receiving a selection of at least one action of the plurality of actions, the at least one action which includes initiation of automated control of one or more pieces of building equipment.

11. The method of claim 10, further comprising:

monitoring, by the one or more processing circuits, responsive to executing at least one action of the plurality of actions, the emission value;

detecting, by the one or more processing circuits, based on subsequent emission information, a change in the emission value; and updating, by the one or more processing circuits, responsive to detection of the change in the emission value, the user interface to reflect the change in the emission value.

12. The method of claim 10, further comprising:

causing, by the one or more processing circuits, responsive to the selection of the at least one action, a machine learning model to generate an output to indicate a change in the emission value resulting from implementation of the at least one action; and updating, by the one or more processing circuits, responsive generation of the output, the user interface to display the change in the emission value.

13. The method of claim 10, further comprising:

determining, by the one or more processing circuits, responsive to execution of the at least one action of the plurality of actions, a change in the emission value; and updating, by the one or more processing circuits, based on the change in the emission value, a machine learning model, wherein the machine learning model is configured to identify correlations between emission values for a plurality of locations and one or more actions to adjust the emission values.

14. The method of claim 10, further comprising:

receiving, by the one or more processing circuits, from the plurality of data sources, subsequent emission information pertaining to a plurality of locations;

determining, by the one or more processing circuits, based on the subsequent emission information, a plurality of emission values;

generating, by the one or more processing circuits, based on the emission value and the plurality of emission values, a list including a plurality of tiers, wherein a first tier of the plurality of tiers is associated with a first emission value of the plurality of emission values; and updating, by the one or more processing circuits, responsive to generation of the list, the user interface to include the list, wherein inclusion of a first location of the plurality of locations within the first tier provides an indication that the first location includes the first emission value.

15. The method of claim 10, further comprising:

transmitting, by the one or more processing circuits, one or more application programming interface calls to a remote device associated with the plurality of data sources; and receiving, by the one or more processing circuits, responsive to transmission of the one or more application programming interface calls, the emission information.

16. The method of claim 10, further comprising:

providing, by the one or more processing circuits, as one or more inputs to a machine learning model, the plurality of emission sources and the emission value, wherein the machine learning model is trained to identify correlations between previously implemented actions and corresponding changes to emission values; and causing, by the one or more processing circuits, the machine learning model to generate the plurality of actions based on a correlation between the emission value and the plurality of actions.

17. One or more non-transitory storage media storing instructions thereon that, when executed by one or more processors, cause the one or more processors to perform operations comprising:

receiving, from a plurality of data sources, emission information corresponding to a location;

extracting, from the emission information, a plurality of emission sources associated with the location, the plurality of emission sources including one or more entities whose operation contributes to emissions at the location;

determining, based on information associated with the plurality of emission sources, an emission value for the location based on a combination of the emissions at the location;

identifying, based on the emission value, a plurality of emission impacts for the plurality of emission sources that resulted in the location having the emission value, wherein a respective emission impact of the plurality of emission impacts indicates a respective contribution, by a corresponding emission source of the plurality of emission sources, to the emission value;

generating, responsive to identification of the plurality of emission impacts, a user interface for display via a display device, the user interface to indicate:

the plurality of emission sources;

the plurality of emission impacts; and a plurality of actions to adjust the emission value or at least one emission impact of the plurality of emission impacts; and executing, responsive to receiving a selection of at least one action of the plurality of actions, the at least one action which includes initiation of automated control of one or more pieces of building equipment.

18. The one or more non-transitory storage media of claim 17, wherein the instructions further cause the one or more processors to perform operations comprising:

monitoring, responsive to executing the at least one action of the plurality of actions, the emission value;

detecting, based on subsequent emission information, a change in the emission value; and updating, responsive to detection of the change in the emission value, the user interface to reflect the change in the emission value.

19. The one or more non-transitory storage media of claim 17, wherein the instructions further cause the one or more processors to perform operations comprising:

causing, responsive to the selection of the at least one action, a machine learning model to generate an output to indicate a change in the emission value resulting from implementation of the at least one action; and updating, responsive generation of the output, the user interface to display the change in the emission value.

* * * * *